(12) United States Patent
Shiraishi

(10) Patent No.: US 10,790,485 B2
(45) Date of Patent: Sep. 29, 2020

(54) ENERGY STORAGE DEVICE AND METHOD OF MANUFACTURING ENERGY STORAGE DEVICE

(71) Applicant: GS Yuasa International Ltd., Kyoto-shi, Kyoto (JP)

(72) Inventor: Yu Shiraishi, Shiga (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/119,150

(22) PCT Filed: Feb. 20, 2015

(86) PCT No.: PCT/JP2015/000825
§ 371 (c)(1),
(2) Date: Aug. 16, 2016

(87) PCT Pub. No.: WO2015/125487
PCT Pub. Date: Aug. 27, 2015

(65) Prior Publication Data
US 2017/0012251 A1 Jan. 12, 2017

(30) Foreign Application Priority Data
Feb. 21, 2014 (JP) .................. 2014-032096

(51) Int. Cl.
*H01M 2/08* (2006.01)
*H01G 11/74* (2013.01)
(Continued)

(52) U.S. Cl.
CPC .............. *H01M 2/08* (2013.01); *H01G 11/66* (2013.01); *H01G 11/74* (2013.01); *H01G 11/80* (2013.01);
(Continued)

(58) Field of Classification Search
CPC ........ H01G 11/66; H01G 11/74; H01G 11/80; H01G 11/823; H01M 10/0525;
(Continued)

(56) References Cited

U.S. PATENT DOCUMENTS 3,427,205 A * 2/1969 Plitt et al. ............... H01M 2/06
429/181
2003/0077511 A1 4/2003 Sato
(Continued)

FOREIGN PATENT DOCUMENTS

JP 03-203157 * 9/1991 .............. H01M 2/04
JP 3203157 9/1991
(Continued)

OTHER PUBLICATIONS

International Search Report dated Apr. 14, 2015 filed in PCT/JP2015/000825.

*Primary Examiner* — Ula C Ruddock
*Assistant Examiner* — Thomas H. Parsons
(74) *Attorney, Agent, or Firm* — Rankin, Hill & Clark LLP

(57) ABSTRACT

In an energy storage device (10) including: a container (100) including a plate-like portion; a positive electrode terminal (200) including a terminal body portion (201); a positive electrode current collector (120); a first gasket (220) including at least a portion that is disposed between the terminal body portion (201) and an outer surface of the plate-like portion, the first gasket (220) including a cylindrical portion (223) that is inserted into the hole portion formed in the plate-like portion; a second gasket (230) including at least a portion that is disposed between an inner surface of the plate-like portion and the positive electrode current collector (120); and a fixing portion (210) including a columnar portion (212) and a swaged portion (214) brought into contact with the positive electrode current collector (120), (Continued)

wherein the cylindrical portion (223) includes an extension portion extending toward the swaged portion (214) from a contact surface at which the inner surface of the plate-like portion and the second gasket (230) are in contact, and the extension portion is disposed adjacently to a space formed between the extension portion and the second gasket (230), or an outer diameter of a distal end portion of the extension portion closest to the swaged portion (214) differs from an outer diameter of a proximal end portion of the extension portion opposite to the distal end portion.

6 Claims, 22 Drawing Sheets

(51) Int. Cl.
*H01G 11/80* (2013.01)
*H01M 2/06* (2006.01)
*H01M 2/04* (2006.01)
*H01M 10/0525* (2010.01)
*H01G 11/82* (2013.01)
*H01M 2/30* (2006.01)
*H01G 11/66* (2013.01)
*H01M 2/02* (2006.01)

(52) U.S. Cl.
CPC ............ *H01G 11/82* (2013.01); *H01M 2/043* (2013.01); *H01M 2/0473* (2013.01); *H01M 2/06* (2013.01); *H01M 2/305* (2013.01); *H01M 10/0525* (2013.01); *H01M 2/024* (2013.01); *H01M 2220/20* (2013.01); *Y02E 60/122* (2013.01); *Y02E 60/13* (2013.01)

(58) Field of Classification Search
CPC .. H01M 2220/20; H01M 2/024; H01M 2/043; H01M 2/0473; H01M 2/06; H01M 2/08; H01M 2/305; H01M 2/0217; Y02E 60/01
See application file for complete search history.

(56) References Cited

U.S. PATENT DOCUMENTS

| 2011/0081572 | A1 | 4/2011 | Kim | |
| 2011/0200870 | A1* | 8/2011 | Kim | H01M 2/06 429/179 |
| 2013/0196221 | A1 | 8/2013 | Murayama | |
| 2013/0196229 | A1* | 8/2013 | Shiraishi | H01G 9/008 429/211 |
| 2014/0036373 | A1 | 2/2014 | Sunagawa | |
| 2014/0363731 | A1 | 12/2014 | Tanaka et al. | |
| 2015/0180007 | A1 | 6/2015 | Ohta | |

FOREIGN PATENT DOCUMENTS

| JP | 2003115286 | A2 | 4/2003 |
| JP | 2003115287 | | 4/2003 |
| JP | 2003115287 | A2 | 4/2003 |
| JP | 2003272574 | A2 | 9/2003 |
| JP | 2008270167 | A2 | 11/2008 |
| JP | 2009110885 | A2 | 5/2009 |
| JP | 2010282848 | A2 | 12/2010 |
| JP | 2011077039 | A2 | 4/2011 |
| JP | 2012049076 | A2 | 3/2012 |
| JP | 2012128961 | A2 | 7/2012 |
| JP | 2012248451 | A2 | 12/2012 |
| JP | 2013157130 | A1 | 8/2013 |
| JP | 2014007051 | | 1/2014 |
| WO | 2012029593 | A1 | 3/2012 |
| WO | 2014002819 | A1 | 1/2014 |

\* cited by examiner (a)

(b)

(a)

(b)

(a)

(b)

(a)

(b)

ENERGY STORAGE DEVICE AND METHOD OF MANUFACTURING ENERGY STORAGE DEVICE

TECHNICAL FIELD

The present invention relates to an energy storage device which includes electrode terminals, current collectors electrically connected to the electrode terminals, and a container which houses the current collectors, and a method of manufacturing such an energy storage device.

BACKGROUND ART

As a measure to cope with a global environmental problem, the conversion from gasoline vehicles to electric vehicles has become important. To accelerate such conversion, the development of an electric vehicle which uses an energy storage device such as a lithium ion secondary battery as a power source has been in progress. Such an energy storage device includes, in general, electrode terminals, current collectors electrically connected to the electrode terminals, and a container which houses the current collectors, and the electrode terminals and the current collectors are fixed to the container.

Under such circumstances, there has been proposed an energy storage device where the container, the electrode terminals and the current collectors are insulated from each other while the container is hermetically sealed by disposing a gasket between the container and the electrode terminals and between the container and the current collectors at the time of fixing the electrode terminals and the current collectors to the container (see patent document 1, for example). In such an energy storage device, sealing property and insulating property are ensured by disposing the gasket between the container and the electrode terminals and between the container and the current collectors and by pressing the gasket by swaging with rivets or the like.

PRIOR ART DOCUMENT

Patent Document

Patent Document 1: JP-A-2003-115286

SUMMARY OF THE INVENTION

Problems to be Solved by the Invention

However, in the above-mentioned conventional energy storage device, damages such as cracking of a gasket occurs at the time of fixing the electrode terminals and the current collectors to the container and hence, there arises a drawback that sealing property and insulating property may not be ensured.

The present invention has been made to overcome the above-mentioned drawback, and it is an object of the present invention to provide an energy storage device which can suppress the occurrence of a damage such as cracking of a gasket disposed between a container and an electrode terminal or between the container and a current collector, and a method of manufacturing such an energy storage device.

Means for Solving the Problems

To achieve the above-mentioned object, according to one aspect of the present invention, there is provided an energy storage device comprising:

a container including a plate-like portion that has an outer surface and an inner surface and includes a hole portion formed thereon;

an electrode terminal including a terminal body portion that is disposed on the outer surface of the plate-like portion;

a current collector disposed on the inner surface of the plate-like portion;

a first gasket including at least a portion that is disposed between the terminal body portion and the outer surface of the plate-like portion in a normal direction of the plate-like portion, the first gasket including a cylindrical portion that is inserted into the hole portion;

a second gasket including at least a portion that is disposed between the inner surface of the plate-like portion and the current collector in the normal direction of the plate-like portion; and a fixing portion including a columnar portion that is inserted into the cylindrical portion and a swaged portion that is formed on an end portion of the columnar portion and is brought into contact with the current collector, wherein the cylindrical portion includes an extension portion extending toward the swaged portion from a contact surface at which the inner surface of the plate-like portion and the second gasket are in contact, and the extension portion is disposed adjacently to a space formed between the extension portion and the second gasket. Alternatively, an outer diameter of a distal end portion of the extension portion closest to the swaged portion in the normal direction of the plate-like portion differs from an outer diameter of a proximal end portion of the extension portion opposite to the distal end portion.

The present invention can be realized not only in the form of such an energy storage device but also in the form of a method of manufacturing an energy storage device for manufacturing such an energy storage device. That is, according to another aspect of the present invention, there is provided a method of manufacturing an energy storage device that includes: a container including a plate-like portion, which has an outer surface and an inner surface and includes a hole portion formed thereon; an electrode terminal including a terminal body portion disposed on the outer surface of the plate-like portion; a current collector disposed on the inner surface of the plate-like portion; a first gasket including at least a portion thereof disposed between the terminal body portion and the outer surface of the plate-like portion in a normal direction of the plate-like portion, the first gasket including a cylindrical portion that is inserted into the hole portion; and a second gasket including at least a portion thereof disposed between the inner surface of the plate-like portion and the current collector in the normal direction of the plate-like portion, the method comprising:

disposing the first gasket and the second gasket such that an extension portion of the cylindrical portion projects toward the swaged portion from a contact surface at which the inner surface of the plate-like portion and the second gasket are in contact, and a space is defined by at least two of the extension portion, the second gasket, the current collector, the inner surface of the plate-like portion and the columnar portion; and forming a swaged portion that is brought into contact with the current collector by inserting the columnar portion of the fixing portion into the cylindrical portion, and by swaging an end portion of the fixing portion.

Advantages of the Invention

According to the energy storage device and the method of manufacturing such an energy storage device of the present invention, it is possible to suppress the occurrence of a damage such as cracking of a gasket disposed between a container and an electrode terminal or between the container and a current collector.

MODE FOR CARRYING OUT THE INVENTION

Figure 1:
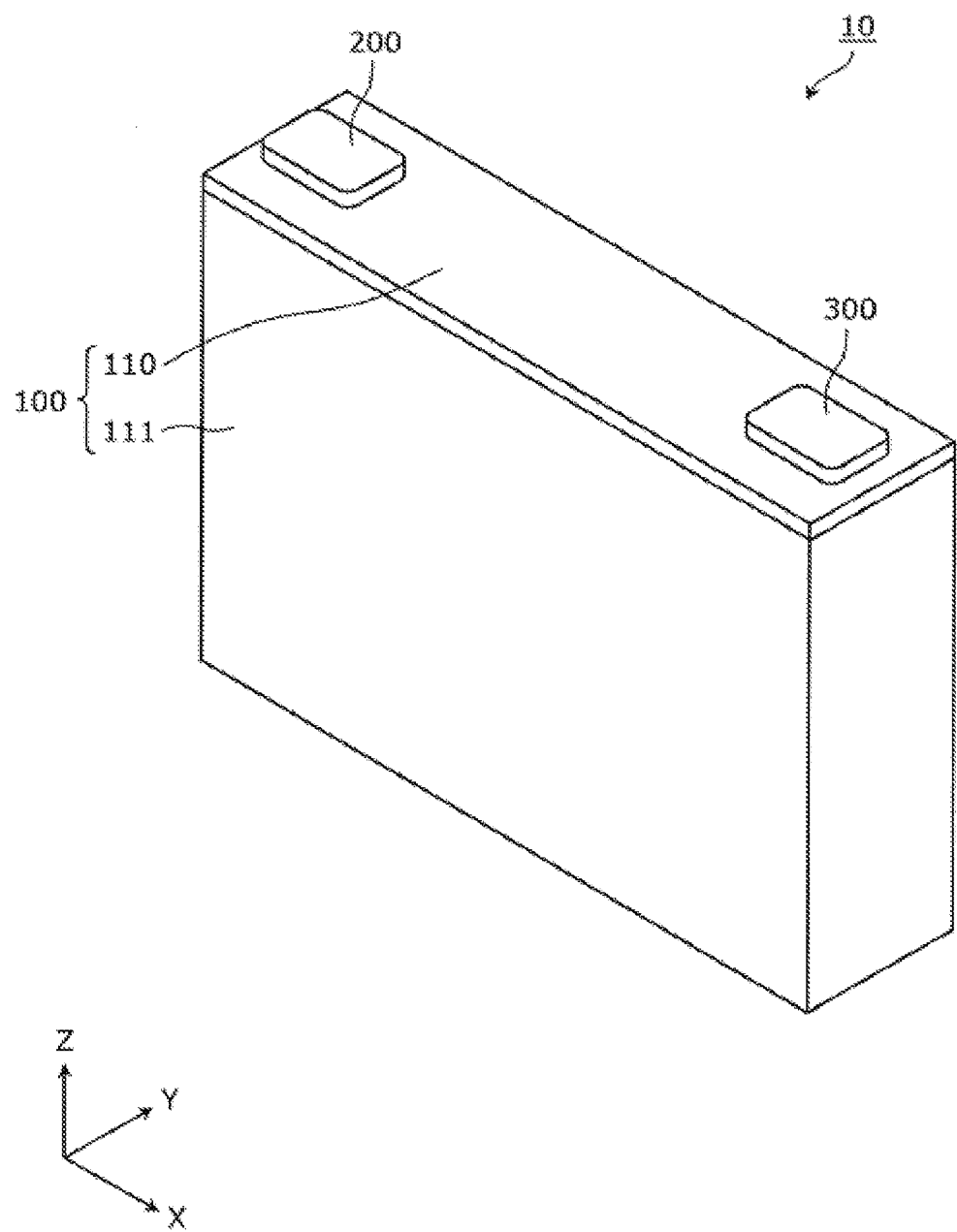
FIG. 1 is a perspective view schematically showing an external appearance of an energy storage device according to an embodiment of the present invention.

Finding Based on which the Present Invention is Made

In the above-mentioned conventional energy storage device, a damage such as cracking of a gasket occurs at the time of fixing electrode terminals and current collectors to a container and hence, there arises a drawback that sealing property and insulating property may not be ensured. That is, in the conventional energy storage device, at the time of fixing the electrode terminals and the current collectors to the container, the gasket is strongly pressed by swaging with rivets or the like. When the gasket is strongly pressed, there may be a case where a damage such as cracking of the gasket occurs.

The present invention has been made to overcome the above-mentioned drawback, and it is an object of the present invention to provide an energy storage device which can suppress the occurrence of a damage such as cracking of a gasket disposed between a container and an electrode terminal or between the container and a current collector, and a method of manufacturing such an energy storage device.

To achieve the above-mentioned object, according to one aspect of the present invention, there is provided an energy storage device comprising:

a container including a plate-like portion that has an outer surface and an inner surface and includes a hole portion formed thereon;

an electrode terminal including a terminal body portion that is disposed on the outer surface of the plate-like portion;

a current collector that is disposed on the inner surface of the plate-like portion;

a first gasket including at least a portion that is disposed between the terminal body portion and the outer surface of the plate-like portion in a normal direction of the plate-like portion, the first gasket including a cylindrical portion that is inserted into the hole portion;

a second gasket including at least a portion that is disposed between the inner surface of the plate-like portion and the current collector in the normal direction of the plate-like portion; and a fixing portion including a columnar portion that is inserted into the cylindrical portion and a swaged portion that is formed on an end portion of the columnar portion and is brought into contact with the current collector, wherein the cylindrical portion includes an extension portion extending toward the swaged portion from a contact surface at which the inner surface of the plate-like portion and the second gasket are in contact, and the extension portion is disposed adjacently to a space formed between the extension portion and the second gasket. Alternatively, an outer diameter of a distal end portion of the extension portion closest to the swaged portion in the normal direction of the plate-like portion differs from an outer diameter of a proximal end portion of the extension portion opposite to the distal end portion.

With such a configuration, the cylindrical portion of the first gasket has the extension portion which extends toward the swaged portion from the contact surface between the container and the second gasket, and the extension portion is formed such that the outer diameter of the distal end portion of the extension portion on a swaged portion side differs from the outer diameter of the proximal end portion of the extension portion. Alternatively, the extension portion is disposed adjacently to the space formed between the extension portion and the second gasket. With such a configuration, it is understood that, at the time of fixing the electrode terminal and the current collector to the container by swaging, the gasket is strongly pressed and the extension portion of the first gasket slips into the space formed adjacently to the fixing portion. Accordingly, it is possible to suppress the occurrence of a damage such as cracking of the gasket disposed between the container and the electrode terminal or between the container and the current collector.

Further, to achieve the above-mentioned object, according to another aspect of the present invention, there is provided an energy storage device comprising:

a container including a plate-like portion that has an outer surface and an inner surface and includes a hole portion formed thereon;

an electrode terminal including a terminal body portion that is disposed on the outer surface of the plate-like portion;

a current collector that is disposed on the inner surface of the plate-like portion;

a first gasket including at least a portion that is disposed between the terminal body portion and the outer surface of the plate-like portion in a normal direction of the plate-like portion;

a second gasket including at least a portion that is disposed between the inner surface of the plate-like portion and the current collector in the normal direction of the plate-like portion, the second gasket including a cylindrical portion that is inserted into the hole portion; and a fixing portion including a columnar portion that is inserted into the cylindrical portion and a swaged portion that is formed on an end portion of the columnar portion and is brought into contact with the terminal body portion, wherein the cylindrical portion includes an extension portion extending toward the swaged portion from a contact surface at which the outer surface of the plate-like portion and the first gasket are in contact, and the extension portion is disposed adjacently to a space formed between the extension portion and the first gasket. Alternatively, an outer diameter of a distal end portion of the extension portion closest to the swaged portion in the normal direction of the plate-like portion differs from an outer diameter of a proximal end portion of the extension portion opposite to the distal end portion.

With such a configuration, the cylindrical portion of the second gasket has the extension portion which extends toward the swaged portion from the contact surface between the container and the first gasket, and the extension portion is formed such that the outer diameter of the distal end portion of the extension portion on the swaged portion side differs from the outer diameter of the proximal end portion of the extension portion. Alternatively, the extension portion is disposed adjacently to the space formed between the extension portion and the first gasket. With such a configuration, it is understood that, at the time of fixing the electrode terminal and the current collector to the container by swaging, the gasket is strongly pressed and the extension portion of the second gasket slips into the space formed adjacently to the fixing portion. Accordingly, it is possible to suppress the occurrence of a damage such as cracking of the gasket disposed between the container and the electrode terminal or between the container and the current collector.

The outer diameter of the distal end portion of the extension portion may be larger than the outer diameter of the proximal end portion of the extension portion in the normal direction of the plate-like portion.

When the fixing portion is swaged, an end portion of the columnar portion on the swaged portion side is formed into an outwardly flared shape. Since the extension portion is formed into a shape where the outer diameter of the distal end portion of the extension portion is larger than the outer diameter of the proximal end portion of the extension portion, the flaring of the end portion of the fixing portion can be accommodated. Accordingly, it is possible to suppress the occurrence of a damage such as cracking of the gasket.

At least one of the extension portion and the second gasket may include a thin wall portion having a smaller thickness than other portions, and the space may be formed at a position adjacent to the thin wall portion.

With such a configuration, the space is formed adjacently to the thin wall portion of at least one of the extension portion and the second gasket and hence, even when the gasket is strongly pressed by swaging, it is possible to ensure a place into which the gasket slips. Accordingly, it is possible to suppress the occurrence of a damage such as cracking of the gasket disposed between the container and the electrode terminal or between the container and the current collector.

An opening portion into which the cylindrical portion is inserted may be formed in the second gasket, and an inner peripheral surface of the opening portion may partially form the space.

With such a configuration, the space into which the gasket can slip when the gasket is strongly pressed can be formed by the inner peripheral surface of the opening portion of the second gasket and hence, the space can be easily formed.

The cylindrical portion may be formed as a body separate from the first gasket.

With such a configuration, the cylindrical portion is formed as a body separate from the first gasket and hence, the individual gasket can be formed into a simple shape whereby the gasket can be manufactured easily.

Further, to achieve the above-mentioned object, according to another aspect of the present invention, there is provided a method of manufacturing an energy storage device that includes: a container including a plate-like portion, which has an outer surface and an inner surface and includes a hole portion formed thereon; an electrode terminal including a terminal body portion disposed on the outer surface of the plate-like portion; a current collector disposed on the inner surface of the plate-like portion; a first gasket including at least a portion thereof disposed between the terminal body portion and the outer surface of the plate-like portion in a normal direction of the plate-like portion, the first gasket including a cylindrical portion that is inserted into the hole portion; and a second gasket including at least a portion thereof disposed between the inner surface of the plate-like portion and the current collector in the normal direction of the plate-like portion, the method comprising:

disposing the first gasket and the second gasket such that an extension portion of the cylindrical portion projects toward the swaged portion from a contact surface at which the inner surface of the plate-like portion and the second gasket are in contact, and a space is defined by at least two of the extension portion, the second gasket, the current collector, the inner surface of the plate-like portion and the columnar portion; and forming a swaged portion that is brought into contact with the current collector by inserting the columnar portion of the fixing portion into the cylindrical portion, and by swaging an end portion of the fixing portion.

With such a configuration, the energy storage device is manufactured in such a manner that the first gasket and the second gasket are disposed in a state where the space is formed in the disposing step, and the end portion of the fixing portion is swaged in the swaging step. Accordingly, even when the gasket is strongly pressed in the swaging step, it is possible to allow the extension portion of the first gasket to slip into the space and hence, it is possible to suppress the occurrence of a damage such as cracking of the gasket disposed between the container and the electrode terminal or between the container and the current collector.

In the disposing of the first gasket and the second gasket, the first gasket and the second gasket may be disposed such that the space is defined by at least the second gasket and the current collector.

When the fixing portion is swaged, an end portion of the columnar portion on the current collector side is formed into an outwardly flared shape. Accordingly, by disposing the first gasket and the second gasket such that the space faces the current collector, the flaring of the end portion of the fixing portion can be accommodated. Accordingly, it is possible to suppress the occurrence of a damage such as cracking of the gasket.

In the disposing of the first gasket and the second gasket, the first gasket and the second gasket may be disposed such that the space expands from a plate-like portion side to a current collector side in a normal direction of the plate-like portion.

With such a configuration, the first gasket and the second gasket are disposed such that the space expands from the plate-like portion side to the current collector side and hence, the flaring of the end portion of the fixing portion can be further accommodated and hence, it is possible to further effectively suppress the occurrence of a damage such as cracking of the gasket.

Further, to achieve the above-mentioned object, according to another aspect of the present invention, there is provided a method of manufacturing an energy storage device that includes: a container including a plate-like portion, which has an outer surface and an inner surface and includes a hole portion formed thereon; an electrode terminal including a terminal body portion disposed on the outer surface of the plate-like portion; a current collector disposed on the inner surface of the plate-like portion; a first gasket including at least a portion thereof disposed between the terminal body portion and the outer surface of the plate-like portion in a normal direction of the plate-like portion; and a second gasket including at least a portion thereof disposed between the inner surface of the plate-like portion and the current collector in the normal direction of the plate-like portion, the second gasket including a cylindrical portion that is inserted into the hole portion, the method comprising:

disposing the first gasket and the second gasket such that an extension portion of the cylindrical portion projects toward the swaged portion from a contact surface at which the outer surface of the plate-like portion and the first gasket are in contact, and a space is defined by at least two of the extension portion, the first gasket, the terminal body portion, the inner surface of the plate-like portion and the columnar portion; and forming a swaged portion that is brought into contact with the terminal body portion by inserting the columnar portion of the fixing portion into the cylindrical portion, and by swaging an end portion of the fixing portion.

In this case, in the disposing step, the first gasket and the second gasket may be disposed such that the space is defined by at least the first gasket and the terminal body portion.

In the disposing step, the first gasket and the second gasket may be disposed such that the space expands from a plate-like portion side to a terminal body portion side in a normal direction of the plate-like portion.

With such a configuration, even when the gasket is strongly pressed in the swaging step, it is possible to allow the extension portion of the second gasket to slip into the space and hence, it is possible to suppress the occurrence of a damage such as cracking of the gasket disposed between the container and the electrode terminal or between the container and the current collector.

Hereinafter, an energy storage device according to an embodiment of the present invention is described with reference to drawings. The embodiment described hereinafter describes preferred specific examples of the present invention. In the embodiment described hereinafter, numerical values, shapes, materials, constitutional elements, the arrangement positions and connection states of the constitutional elements, manufacturing steps, the order of manufacturing steps and the like are merely examples, and these are not intended to limit the present invention. Further, among the constitutional elements in the embodiment described hereinafter, the constitutional elements which are not described in independent claims describing an uppermost concept are described as arbitrary constitutional elements.

Embodiment

First, the configuration of an energy storage device 10 is described.

Figure 2:
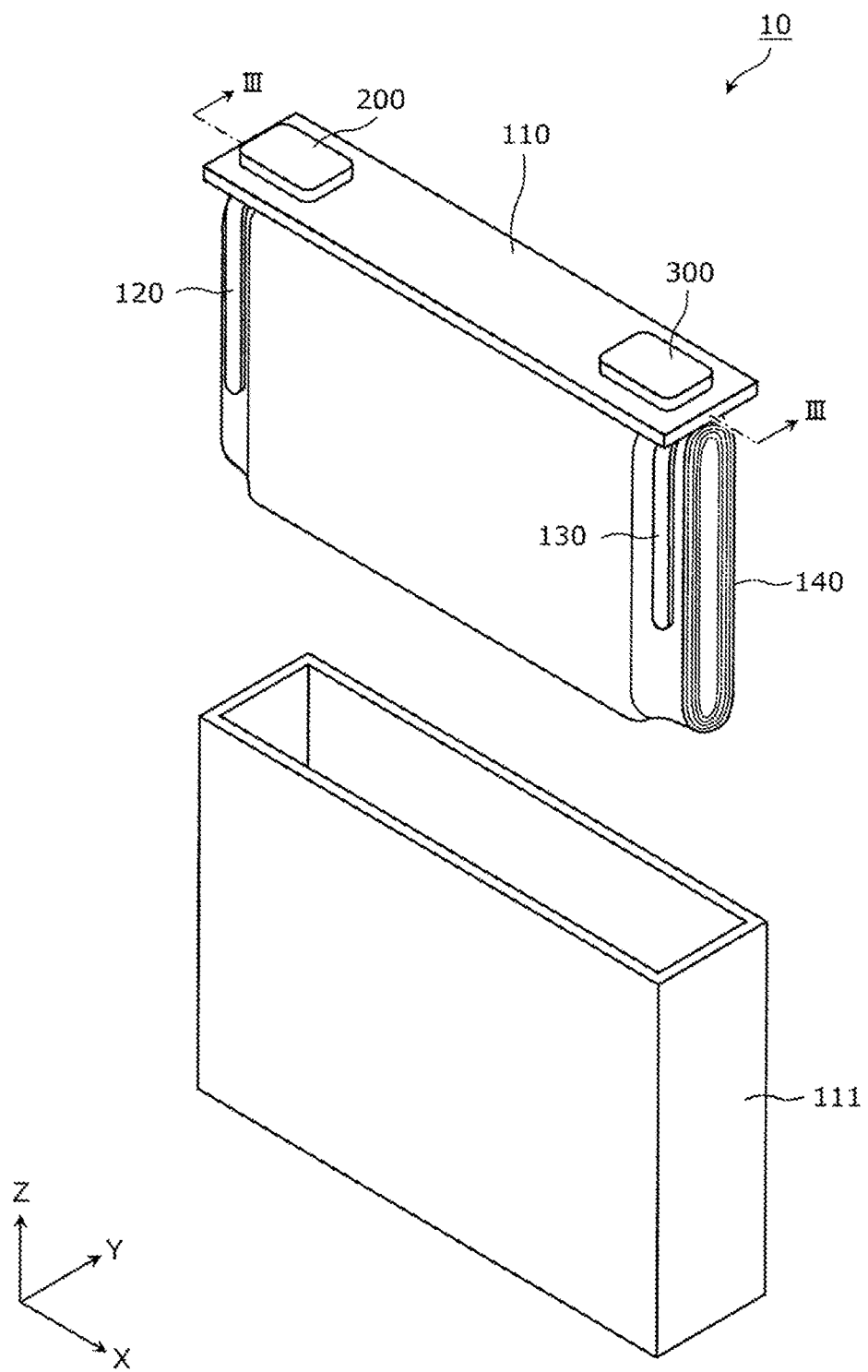
FIG. 2 is a perspective view showing respective constitutional elements which the energy storage device includes in a state where a body of a container of the energy storage device according to the embodiment of the present invention is removed.

FIG. 1 is a perspective view schematically showing an external appearance of the energy storage device 10 according to the embodiment of the present invention. FIG. 2 is a perspective view showing respective constitutional elements which the energy storage device 10 according to the embodiment of the present invention includes in a state where a body 111 of a container 100 of the energy storage device 10 is separated from other constitutional elements of the energy storage device 10.

In these drawings, the Z axis direction is indicated as the vertical direction, and the description is made hereinafter using the Z axis direction as the vertical direction. However, there may be a case where the Z axis direction does not extend in the vertical direction depending on a mode of use and hence, the Z axis direction is not limited to the vertical direction. The same goes for drawings which are referenced hereinafter.

The energy storage device 10 is a secondary battery capable of charging and discharging electricity. To be more specific, the energy storage device 10 is a nonaqueous electrolyte secondary battery such as a lithium ion secondary battery. The energy storage device 10 is not limited to a nonaqueous electrolyte secondary battery, and may be a secondary battery other than a nonaqueous electrolyte secondary battery, or may be a capacitor.

As shown in these drawings, the energy storage device 10 includes a container 100, a positive electrode terminal 200, and a negative electrode terminal 300. Further, in the container 100, a positive electrode current collector 120, a negative electrode current collector 130, and an electrode assembly 140 are housed.

A liquid such as an electrolyte solution (nonaqueous electrolyte) is filled in the container 100 of the energy storage device 10. However, the illustration of the liquid is omitted in the drawing. A kind of electrolyte solution filled in the container 100 is not particularly limited provided that the performance of the energy storage device 10 is not impaired, and various electrolyte solutions can be selectively used.

The container 100 is formed of: a body 111 having a bottomed rectangular cylindrical shape; and a lid body 110 formed of a plate-like member which closes an opening of the body 111. The container 100 is configured such that the inside of the container 100 is hermetically sealed by joining the lid body 110 and the body 111 to each other by welding or the like after the positive electrode current collector 120, the negative electrode current collector 130, the electrode assembly 140 and the like are housed in the container 100. Although a material for forming the lid body 110 and a material for forming the body 111 are not particularly limited, it is preferable that the lid body 110 and the body 111 be made of weldable metal such as stainless steel, aluminum, an aluminum alloy, iron or a plated steel sheet, for example.

The electrode assembly 140 is a member which includes a positive electrode, a negative electrode and a separator, and can store electricity. The positive electrode is formed such that a positive active material layer is formed on a positive electrode substrate foil which is a metal foil having an elongated strip shape and made of aluminum, an aluminum alloy or the like. The negative electrode is formed such that a negative active material layer is formed on a negative electrode substrate foil which is a metal foil having an elongated strip shape and made of copper, a copper alloy or the like. The separator is formed using a microporous sheet made of a resin.

In this embodiment, as a positive active material used for forming the positive active material layer or a negative active material used for forming the negative active material layer, known materials can be used as desired provided that the positive active material or the negative active material can occlude and discharge lithium ions.

The electrode assembly 140 is formed by winding a layered sheet which is formed of the negative electrode, the positive electrode and the separator sandwiched between the negative electrode and the positive electrode. The electrode assembly 140 is electrically connected to the positive electrode current collector 120 and the negative electrode current collector 130. In the drawing, the electrode assembly 140 having an elongated circular shape is shown. However, the electrode assembly 140 may have a circular shape or an elliptical shape. The electrode assembly 140 is not limited to an electrode assembly of a winding type, and may be an electrode assembly of a stacking type where plates having a flat plate shape are stacked in multiple layers.

A positive electrode terminal 200 is an electrode terminal electrically connected to the positive electrode of the electrode assembly 140, and a negative electrode terminal 300 is an electrode terminal electrically connected to the negative electrode of the electrode assembly 140. That is, the positive electrode terminal 200 and the negative electrode terminal 300 are conductive electrode terminals through which electricity stored in the electrode assembly 140 is discharged to a space outside the energy storage device 10 and through which electricity is introduced into a space inside the energy storage device 10 for storing the electricity in the electrode assembly 140.

The positive electrode terminal 200 and the negative electrode terminal 300 are mounted on the lid body 110 disposed above the electrode assembly 140. To be more specific, the positive electrode terminal 200 is fixed to the lid body 110 together with the positive electrode current collector 120 by swaging with a rivet or the like. In the same manner, the negative electrode terminal 300 is fixed to the lid body 110 together with the negative electrode current collector 130 by swaging with a rivet or the like. The detailed configuration where the positive electrode terminal 200 and the negative electrode terminal 300 are fixed to the lid body 110 together with the positive electrode current collector 120 and the negative electrode current collector 130 respectively is described later.

The positive electrode current collector 120 is a member having conductivity and rigidity and is disposed between the positive electrode of the electrode assembly 140 and a side wall of the body 111 of the container 100. The positive electrode current collector 120 is electrically connected to the positive electrode terminal 200 and the positive electrode of the electrode assembly 140. In the same manner as the positive electrode substrate foil of the electrode assembly 140, the positive electrode current collector 120 is made of aluminum, an aluminum alloy or the like.

The negative electrode current collector 130 is a member having conductivity and rigidity and is disposed between the negative electrode of the electrode assembly 140 and a side wall of the body 111 of the container 100. The negative electrode current collector 130 is electrically connected to the negative electrode terminal 300 and the negative electrode of the electrode assembly 140. In the same manner as the negative electrode substrate foil of the electrode assembly 140, the negative electrode current collector 130 is made of copper, a copper alloy or the like.

Next, the description is made with respect to the configuration where the positive electrode terminal 200 and the negative electrode terminal 300 are fixed to the lid body 110 together with the positive electrode current collector 120 and the negative electrode current collector 130. First, the configuration is schematically described.

Figure 3:
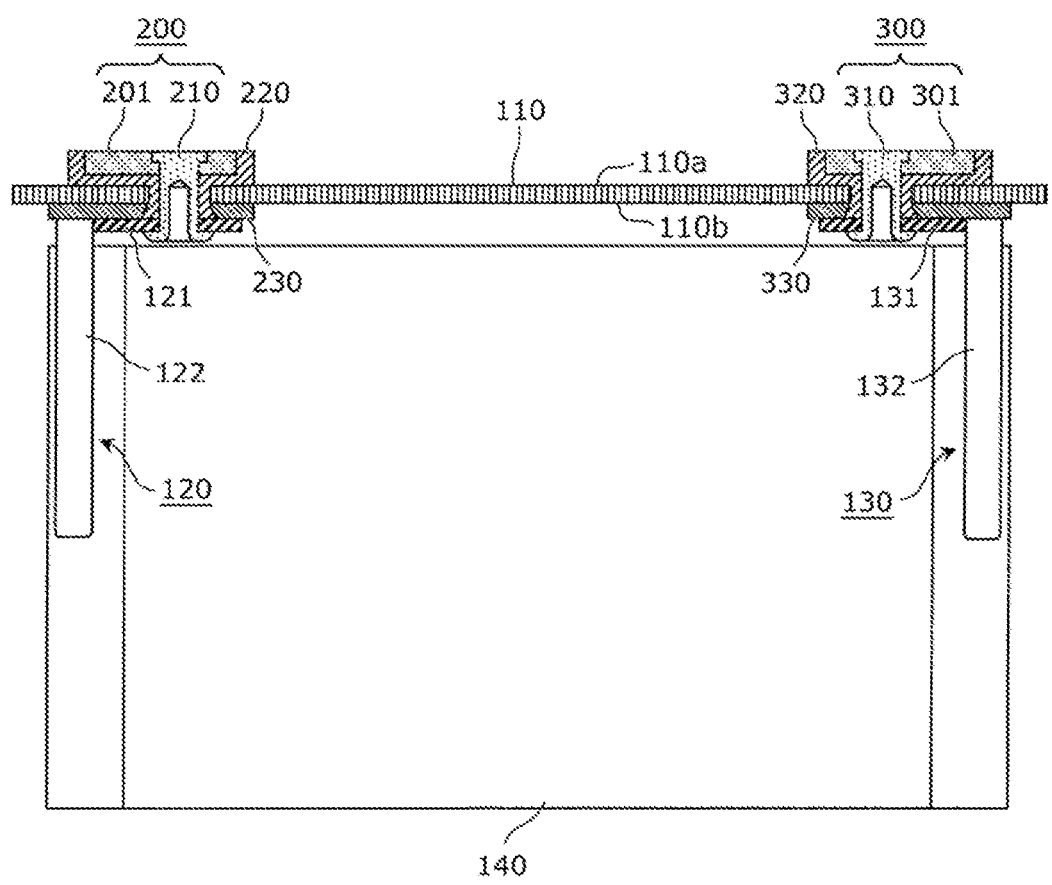
FIG. 3 is a cross-sectional view showing a configuration where a positive electrode terminal and a negative electrode terminal according to the embodiment of the present invention are fixed to a lid body together with a positive electrode current collector and a negative electrode current collector.

FIG. 3 is a cross-sectional view showing a configuration in the embodiment of the present invention where the positive electrode terminal 200 and the negative electrode terminal 300 are fixed to the lid body 110 together with the positive electrode current collector 120 and the negative electrode current collector 130 respectively. To be more specific, FIG. 3 is a cross-sectional view of the energy storage device 10 shown in FIG. 2 taken along a plane parallel to an XZ plane including line III-III, and showing the configuration of the positive electrode terminal 200 and the negative electrode terminal 300 and constitutional elements around the positive electrode terminal 200 and the negative electrode terminal 300.

As shown in FIG. 3, the energy storage device 10 further includes a first gasket 220 and a second gasket 230 on a side where the positive electrode terminal 200 and the positive electrode current collector 120 are disposed, and the positive electrode terminal 200 includes a terminal body portion 201, and a fixing portion 210. In the same manner as described above, the energy storage device 10 further includes a first gasket 320 and a second gasket 330 on a side where the negative electrode terminal 300 and the negative electrode current collector 130 are disposed, and the negative electrode terminal 300 includes a terminal body portion 301, and a fixing portion 310.

Each of the first gasket 220, 320 is a gasket disposed between the electrode terminal and the container 100. That is, the first gasket 220, 320 is a gasket at least a part of which is disposed between the terminal body portion 201, 301 and an outer surface 110*a* of the lid body 110 (a surface on a plus side in the Z axis direction) in a normal direction (Z axis direction) of the lid body 110. To be more specific, the first gasket 220 is disposed between the positive electrode terminal 200 and the lid body 110 of the container 100, and the first gasket 320 is disposed between the negative electrode terminal 300 and the lid body 110. It is preferable that the first gasket 220, 320 be made of an insulating material, and be made of a resin such as polyphenylene sulfide (PPS) or polypropylene (PP), for example.

Each of the second gasket 230, 330 is a gasket disposed between the current collector and the container 100. That is, the second gasket 230, 330 is a gasket at least a part of which is disposed between an inner surface 110*b* of the lid body 110 and a current collector in a normal direction of the lid body 110. To be more specific, the second gasket 230 is disposed between a terminal-side connecting portion 121 of the positive electrode current collector 120 and the lid body 110 of the container 100, and the second gasket 330 is disposed between a terminal-side connecting portion 131 of the negative electrode current collector 130 and the lid body 110. It is preferable that the second gasket 230, 330 be made of an insulating material, and be made of a resin such as polyphenylene sulfide (PPS) or polypropylene (PP), for example.

The positive electrode current collector 120 is disposed on an inner surface 110*b* (a surface on a minus side in the Z axis direction) of the lid body 110. The positive electrode current collector 120 includes the flat-plate-like terminal-side connecting portion 121 which is connected to the positive electrode terminal 200, and an electrode assembly connecting portion 122 which is joined to one end of the electrode assembly 140 and is formed of two elongated legs. In the same manner as the positive electrode current collector 120, the negative electrode current collector 130 is disposed on the inner surface 110*b* (a surface on a minus side in the Z axis direction) of the lid body 110. The negative electrode current collector 130 includes a flat-plate-like terminal-side connecting portion 131 connected to the negative electrode terminal 300, and an electrode assembly connecting portion 132 which is joined to the other end of the electrode assembly 140 and is formed of two elongated legs.

The terminal body portions 201, 301 are body portions of electrode terminals disposed on an outer surface 110*a* of the lid body 110 of the container 100. To be more specific, the terminal body portion 201 is a body portion of the positive electrode terminal 200, and is disposed outside (on an upper side, on a plus side in the Z axis direction) of the lid body 110 of the container 100. On the other hand, the terminal body portion 301 is a body portion of the negative electrode terminal 300, and is disposed outside (on an upper side, on a plus side in the Z axis direction) of the lid body 110. The terminal body portions 201, 301 are respectively made of a conductive material such as metal.

The fixing portions 210, 310 are portions where the terminal body portions 201, 301 and the current collectors are fixed to the container 100. To be more specific, by the fixing portion 210, the terminal body portion 201 and the terminal-side connecting portion 121 of the positive electrode current collector 120 are fixed to the lid body 110 of the container 100. Further, by the fixing portion 310, the terminal body portion 301 and the terminal-side connecting portion 131 of the negative electrode current collector 130 are fixed to the lid body 110. The fixing portions 210, 310 are respectively made of a conductive material such as metal.

The fixing portions 210, 310 are respectively formed of a rivet (a hollow rivet) in this embodiment. However, provided that the terminal body portion 201, 301 and the current collector can be fixed to the container 100 with the fixing portions 210, 310, the fixing portions 210, 310 are not limited to a hollow rivet and a solid rivet. The fixing portions 210, 310 may adopt the configuration where such fixing is performed by fastening with a bolt or a screw, the configuration where such fixing is performed by welding or the like, for example.

The terminal body portion 201 and the fixing portion 210 may be formed as an integral body. In the same manner, the terminal body portion 301 and the fixing portion 310 may be formed as an integral body. That is, the positive electrode terminal 200 may be formed as one member, and also the negative electrode terminal 300 may be formed as one member.

Next, the detail of the configuration where the positive electrode terminal 200 and the negative electrode terminal 300 are fixed to the lid body 110 together with the positive electrode current collector 120 and the negative electrode current collector 130 respectively is described. The configuration where the positive electrode terminal 200 is fixed to the lid body 110 together with the positive electrode current collector 120 and the configuration where the negative electrode terminal 300 is fixed to the lid body 110 together with the negative electrode current collector 130 are substantially equal to each other and hence, the description is made mainly with respect to the configuration on a positive electrode terminal 200 side hereinafter, and the description with respect to the configuration on a negative electrode terminal 300 side is omitted or simplified.

First, respective constitutional elements before the positive electrode terminal 200 and the positive electrode current collector 120 are fixed to the lid body 110 are described in detail.

Figure 4:
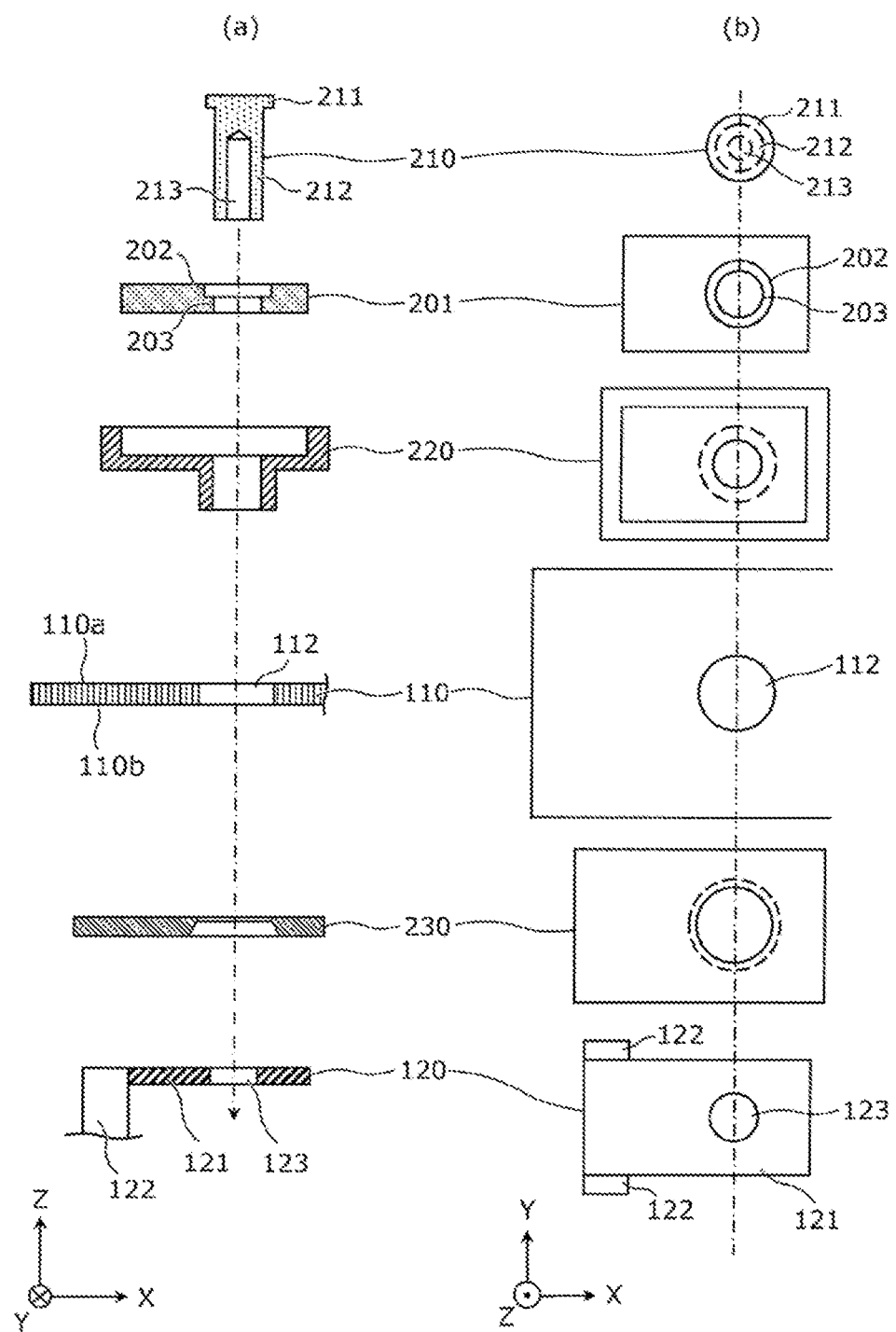
FIG. 4 is an exploded view showing respective constitutional elements in a state where the positive electrode terminal and the respective constitutional elements around the positive electrode terminal of the energy storage device according to the embodiment of the present invention are disassembled.

FIG. 4 is an exploded view showing the respective constitutional elements in a state where the positive electrode terminal 200 and the respective constitutional elements around the positive electrode terminal 200 of the energy storage device 10 according to the embodiment of the present invention are disassembled. To be more specific, FIG. 4(a) is a cross-sectional view when the positive electrode terminal 200 shown in FIG. 3 and the respective constitutional elements around the positive electrode terminal 200 are disassembled (a view of the respective constitutional elements before being assembled), and FIG. 4(b) is a plan view of the respective constitutional elements as viewed from above (a plus side in the Z axis direction).

As shown in the drawings, the fixing portion 210 is formed of a circular columnar member having a lower portion (a portion on a minus side in the Z axis direction) which is formed into a hollow shape. To be more specific, the fixing portion 210 has an upper surface portion 211 and a columnar portion 212, and a space 213 is formed in the columnar portion 212.

The upper surface portion 211 is a portion having a disc shape, and is fitted in a recessed portion 202 of the terminal body portion 201 described later. The columnar portion 212 is a portion having a circular columnar shape (a lower portion being formed into a circular cylindrical shape) and projecting downward (toward a minus side in the Z axis direction) from the upper surface portion 211. The columnar portion 212 is inserted into the terminal body portion 201, the first gasket 220, the second gasket 230, and the terminal-side connecting portion 121 of the positive electrode current collector 120. Further, the columnar portion 212 is disposed in a lid body hole portion 112 formed in the lid body 110 of the container 100.

The terminal body portion 201 is formed of a rectangular flat-plate-like member, and includes a recessed portion 202 and a terminal opening portion 203 both having a circular shape as viewed in a top plan view. That is, the terminal opening portion 203 is a through hole which is formed in the terminal body portion 201 and has a circular shape in cross section, and the recessed portion 202 is a concave-shaped portion (indent) formed on a periphery of the terminal opening portion 203 so as to surround the terminal opening portion 203. A cross-sectional shape of the terminal opening portion 203 is not limited to a circular shape, and may be an elliptical shape, a rectangular shape or the like. Further, the terminal opening portion 203 is not limited to the through hole, and may be a cutout which is formed by cutting out the terminal body portion 201 in a semicircular shape, a rectangular shape or the like.

The first gasket 220 is a rectangular flat-shaped member in which an opening portion is formed. Hereinafter, the configuration of the first gasket 220 is described in detail.

Figure 5:
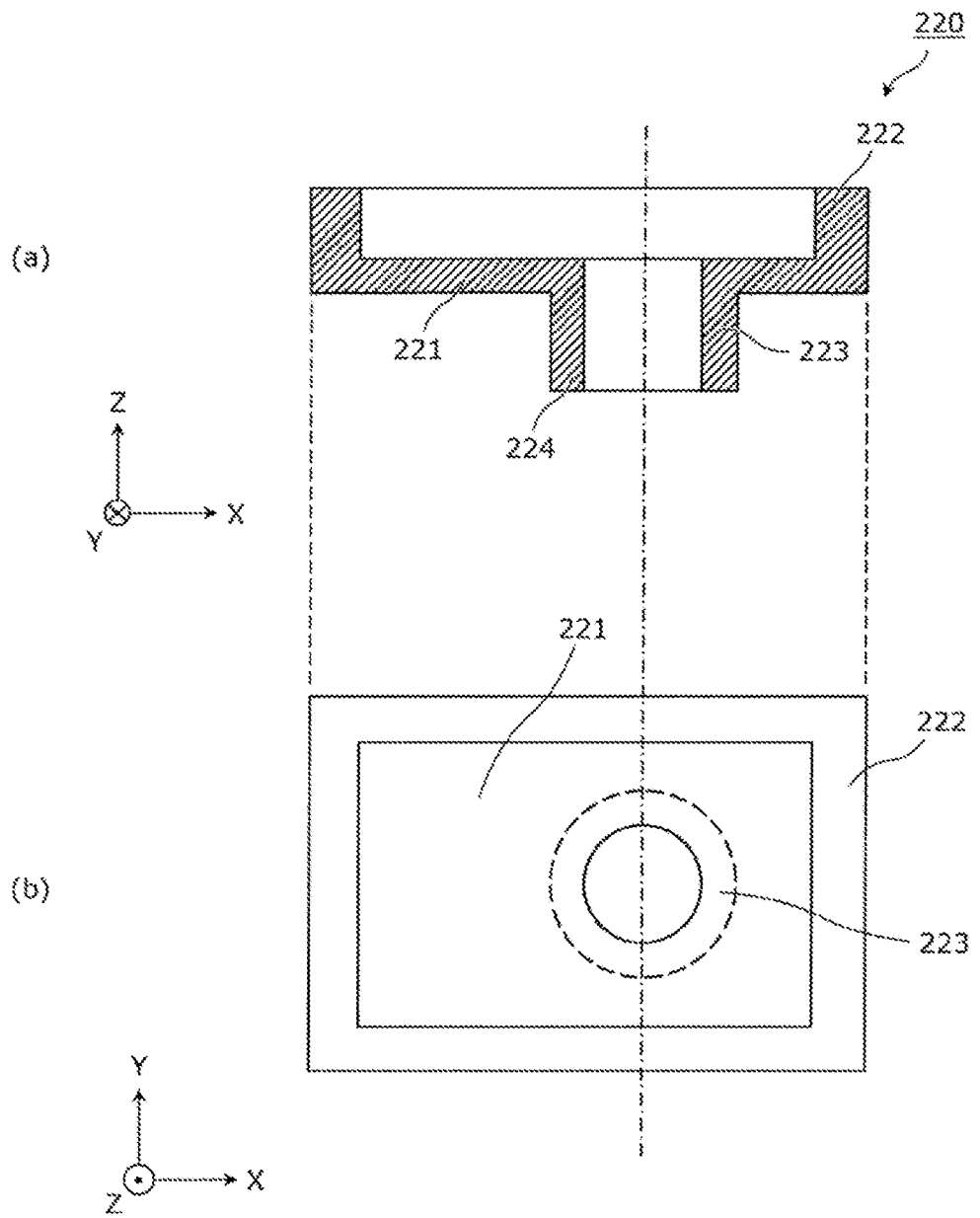
FIG. 5 is a view showing a configuration of a first gasket according to the embodiment of the present invention.

FIG. 5 is a view showing the configuration of the first gasket 220 according to the embodiment of the present invention. To be more specific, FIG. 5(a) is a cross-sectional view of the first gasket 220 shown in FIG. 4 (a view of the first gasket 220 before being assembled with the respective constitutional elements), and FIG. 5(b) is a plan view of the first gasket 220 as viewed from above (a plus side in the Z axis direction).

As shown in the drawings, the first gasket 220 has a flat plate portion 221, a projecting portion 222 which projects upward (toward a plus side in the Z axis direction) from the flat plate portion 221, and a cylindrical portion 223 which has a cylindrical shape and projects downward (toward a minus side in the Z axis direction) from the flat plate portion 221.

The flat plate portion 221 is a rectangular flat-plate-like portion, and is disposed between the terminal body portion 201 of the positive electrode terminal 200 and the terminal-side connecting portion 121 of the positive electrode current collector 120.

The projecting portion 222 is an annular portion projecting upward from an outer edge of the flat plate portion 221, and has a rectangular cylindrical shape. Further, a recessed portion is formed on the first gasket 220 in a state where the recessed portion is surrounded by the projecting portion 222, and the terminal body portion 201 of the positive electrode terminal 200 is disposed in the recessed portion.

An opening portion having a circular shape in cross section is formed in the flat plate portion 221, and the cylindrical portion 223 is an annular portion projecting downward from an edge of the opening portion and has a circular cylindrical shape. The cylindrical portion 223 is disposed outside (periphery) the fixing portion 210 of the positive electrode terminal 200 and inside the opening portion of the container 100. That is, the columnar portion 212 of the fixing portion 210 is inserted into the cylindrical portion 223 and, at the same time, the cylindrical portion 223 is inserted into the lid body hole portion 112 of the lid body 110 described later.

As described above, a through hole is formed in the first gasket 220 by the cylindrical portion 223, and the recessed portion is formed on the periphery of the through hole by the projecting portion 222. A cross-sectional shape of the opening portion formed in the flat plate portion 221 is not limited to a circular shape, and may be an elliptical shape, a rectangular shape or the like. That is, a shape of the cylindrical portion 223 is not limited to the circular cylindrical shape, and may be an elliptic cylindrical shape, a rectangular cylindrical shape or the like.

A first connecting portion 224 which forms an extension portion extending toward a swaged portion 214 described later is disposed on a distal end portion of the cylindrical portion 223. The first connecting portion 224 is a portion to be connected to the second gasket 230. The first connecting portion 224 is described in detail later.

Returning to FIG. 4, the lid body 110 is a rectangular flat-plate-like portion, and has the lid body hole portion 112 having a circular shape in cross section. That is, the lid body 110 is a plate-like portion which has the outer surface 110a (the surface on a plus side in the Z axis direction) and the inner surface 110b (the surface on a minus side in the Z axis direction). The lid body hole portion 112 which is a through hole is also formed in the lid body 110. In the lid body hole portion 112, the columnar portion 212 of the fixing portion 210 of the positive electrode terminal 200 and the cylindrical portion 223 of the first gasket 220 are inserted. A cross-sectional shape of the lid body hole portion 112 is not limited to a circular shape, and may be an elliptical shape, a rectangular shape or the like, and the lid body hole portion 112 is not limited to a through hole, and may be a cutout formed by cutting out the lid body 100 into a semicircular shape, a rectangular shape or the like.

The second gasket 230 is a rectangular flat-shaped member in which an opening portion is formed. Hereinafter, the configuration of the second gasket 230 is described in detail.

Figure 6:
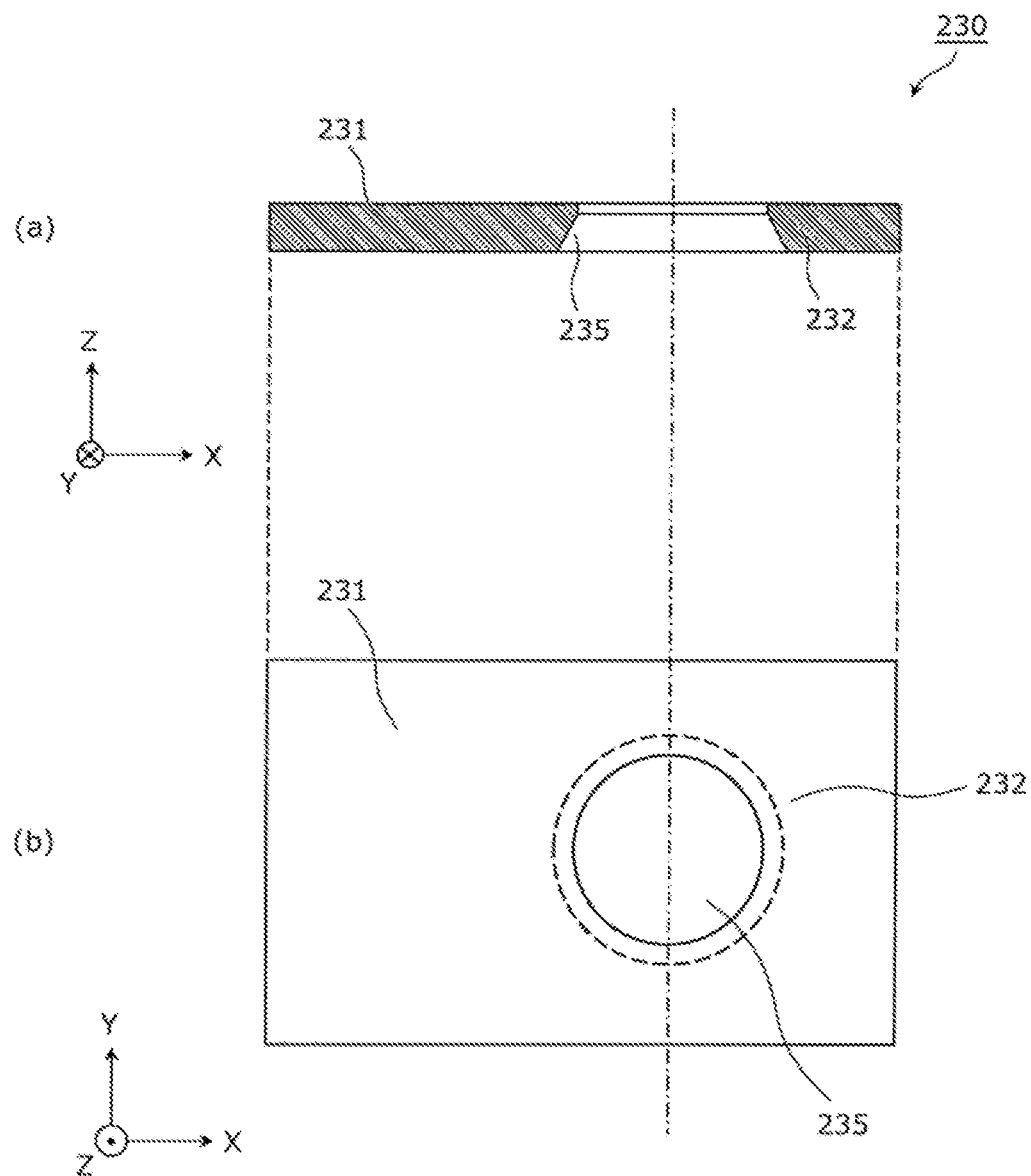
FIG. 6 is a view showing a configuration of a second gasket according to the embodiment of the present invention.

FIG. 6 is a view showing the configuration of the second gasket 230 according to the embodiment of the present invention. To be more specific, FIG. 6(a) is a cross-sectional view of the second gasket 230 shown in FIG. 4 (a view of the second gasket 230 before being assembled with the respective constitutional elements), and FIG. 6(b) is a plan view of the second gasket 230 as viewed from above (a plus side in the Z axis direction).

As shown in the drawings, the second gasket 230 has a rectangular flat-plate-like flat plate portion 231, and a second connecting portion 232 disposed on an inner side of the flat plate portion 231. The second connecting portion 232 is a portion connected to the first connecting portion 224 of the first gasket 220, and has a through hole 235. The through hole 235 is a circular hole portion in which the fixing portion 210 of the positive electrode terminal 200 is disposed. That is, the columnar portion 212 of the fixing portion 210 is inserted into the through hole 235.

The second connecting portion 232 is configured such that an upper portion of the second connecting portion 232 has a circular cylindrical shape, and an inner diameter of the second connecting portion 232 is gradually increased toward a lower side from a lower end of the circular cylindrical shape (an end on a minus side in the Z axis direction). That is, the second connecting portion 232 has an inclined surface where a diameter of an inner surface of the second connecting portion 232 is gradually increased toward a lower side. The through hole 235 is an opening portion having an upper portion thereof formed into a circular columnar shape, and a center portion and a lower portion thereof formed into a frustoconical shape. In other words, the second connecting portion 232 includes a thin wall portion where a wall thickness is gradually decreased toward the through hole 235. A cross-sectional shape of the through hole 235 is not limited to a circular shape, and may be an elliptical shape, a rectangular shape or the like.

Returning to FIG. 4, as described above, the positive electrode current collector 120 includes the terminal-side connecting portion 121 and two electrode assembly connecting portions 122. A current collector opening portion 123 is formed in the terminal-side connecting portion 121. The current collector opening portion 123 is a through hole having a circular shape in cross section, and the columnar portion 212 of the fixing portion 210 of the positive electrode terminal 200 is inserted into the current collector opening portion 123. A cross-sectional shape of the current collector opening portion 123 is not limited to a circular shape, and may be an elliptical shape, a rectangular shape or the like. Further, the current collector opening portion 123 is not limited to a through hole, and may be formed by cutting out the terminal-side connecting portion 121 into a semicircular shape, a rectangular shape or the like.

Next, the configuration of the energy storage device 10 obtained after the positive electrode terminal 200 and the positive electrode current collector 120 are fixed to the lid body 110 is described.

Figure 7:
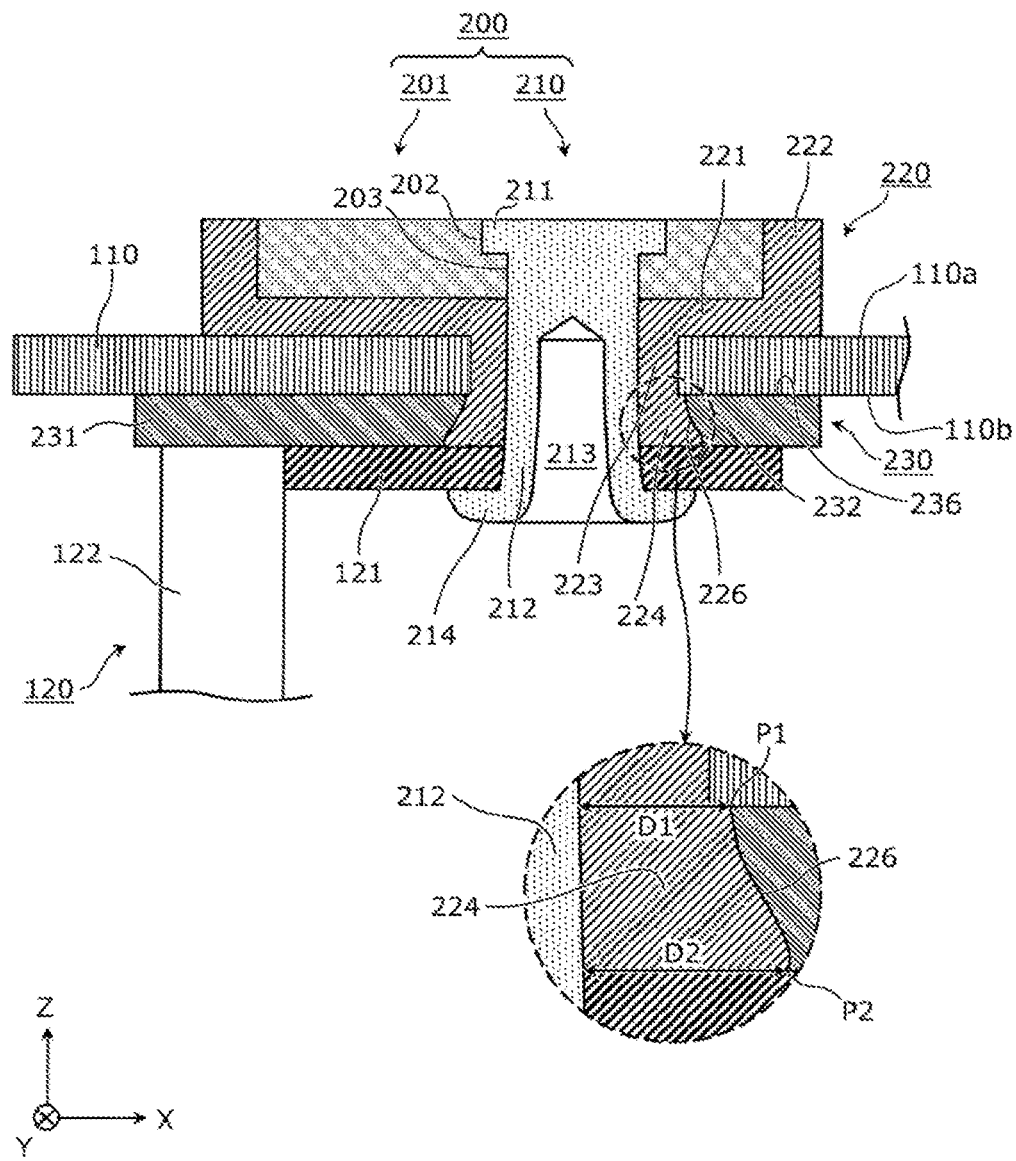
FIG. 7 is a cross-sectional view showing a configuration where the positive electrode terminal according to the embodiment of the present invention is fixed to the lid body together with the positive electrode current collector.

FIG. 7 is a cross-sectional view showing the configuration where the positive electrode terminal 200 according to the embodiment of the present invention is fixed to the lid body 110 together with the positive electrode current collector 120. To be more specific, FIG. 7 is an enlarged cross-sectional view showing the positive electrode terminal 200 shown in FIG. 3 and the constitutional elements around the positive electrode terminal 200 in an enlarged manner.

As shown in the drawing, the fixing portion 210 of the positive electrode terminal 200 fixes the terminal body portion 201 and the positive electrode current collector 120 to the container 100 by sandwiching the terminal body portion 201 and the positive electrode current collector 120 in a state where the first gasket 220 and the second gasket 230 are disposed between the terminal body portion 201 of the positive electrode terminal 200 and the positive electrode current collector 120.

That is, the terminal body portion 201 and the positive electrode current collector 120 are fixed to the lid body 110 of the container 100 by being swaged with a rivet, for example, which forms the fixing portion 210 in a state where the first gasket 220 and the second gasket 230 are sandwiched between the terminal body portion 201 and the positive electrode current collector 120. The fixing portion 210 is pressed such that a lower end portion of the columnar portion 212 is flared outwardly by swaging thus forming a swaged portion 214.

The swaged portion 214 is disposed on the fixing portion 210 at a positive electrode current collector 120 side (on a minus side in the Z axis direction). That is, the swaged portion 214 is a portion formed by swaging an end portion of the fixing portion 210 on the positive electrode current collector 120 side. In other words, the swaged portion 214 is a portion which is formed on an end portion of the columnar portion 212 and is brought into contact with the positive electrode current collector 120. To be more specific, the swaged portion 214 is an annular portion which projects toward the inside of the container 100 from the terminal-side connecting portion 121 of the positive electrode current collector 120, and also projects radially outward from the columnar portion 212. Further, the space 213 is formed in the fixing portion 210 such that a diameter of the space 213 is gradually increased toward a swaged portion 214 side.

The second gasket 230 is disposed between the swaged portion 214 and the lid body 110. That is, the second gasket 230 is a gasket disposed on a swaged portion 214 side, and the first gasket 220 is a gasket disposed on a side opposite to the swaged portion 214.

The cylindrical portion 223 of the first gasket 220 is disposed outside the columnar portion 212 in a projecting manner toward a swaged portion 214 side from a surface 236 of the second gasket 230 on a lid body 110 side. In this embodiment, the cylindrical portion 223 is disposed in a state where the first connecting portion 224 is made to project until the first connecting portion 224 is brought into contact with the terminal-side connecting portion 121 of the positive electrode current collector 120. That is, the first connecting portion 224 is an extension portion which extends toward the swaged portion 214 from a contact surface between the inner surface 110b of the lid body 110 and the second gasket 230. With such a configuration, the first connecting portion 224 is disposed between the terminal-side connecting portion 121 and the lid body 110, and the first connecting portion 224 and the second connecting portion 232 of the second gasket 230 are deformed by being pressed and are brought into contact with each other between the terminal-side connecting portion 121 and the lid body 110.

Due to the contact of the first connecting portion 224 and the second connecting portion 232, a boundary 226 between the first connecting portion 224 and the second connecting portion 232 is formed. The boundary 226 has a shape substantially equal to a shape of an approximately frustoconical side surface whose diameter is increased toward a swaged portion 214 side from a lid body 110 side.

The cylindrical portion 223 is formed such that a distance from the columnar portion 212 on the boundary 226 between the cylindrical portion 223 and the second gasket 230 differs between an end portion (an end portion P1 in the drawing) on a lid body 110 side and an end portion (an end portion P2 in the drawing) on a swaged portion 214 side. To be more specific, the cylindrical portion 223 is formed such that a distance between the end portion P2 on the swaged portion 214 side of the boundary 226 and the columnar portion 212 (a distance D2 in the drawing) becomes larger than a distance between the end portion P1 on the lid body 110 side of the boundary 226 and the columnar portion 212 (a distance D1 in the drawing).

In other words, with respect to the first connecting portion 224 which forms the extension portion of the cylindrical portion 223, in a normal direction (Z axis direction) of the lid body 110, an outer diameter of a distal end portion closest to the swaged portion 214 (a distance between a center axis of the first connecting portion 224 and the end portion P2) differs from an outer diameter of a proximal end portion on a side opposite to the distal end portion (a distance between the center axis and the end portion P1). That is, the first connecting portion 224 is formed such that the outer diameter of the distal end portion is larger than the outer diameter of the proximal end portion in the normal direction of the lid body 110.

Next, a method of manufacturing the energy storage device 10 is described.

Figure 8:
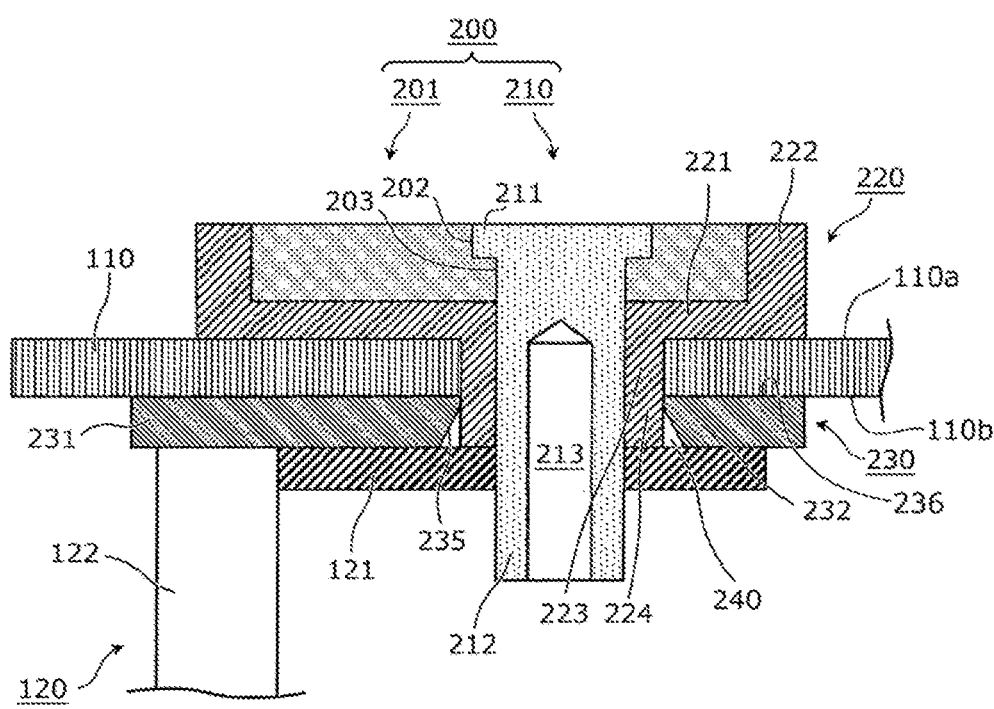
FIG. 8 is a cross-sectional view showing a configuration before the positive electrode terminal according to the embodiment of the present invention is fixed to the lid body together with the positive electrode current collector.
Figure 8:
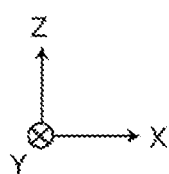

FIG. 8 is a cross-sectional view showing the configuration before the positive electrode terminal 200 according to the embodiment of the present invention is fixed to the lid body 110 together with the positive electrode current collector 120. To be more specific, FIG. 8 is a cross-sectional view showing a state before the positive electrode terminal 200 shown in FIG. 7 is fixed to the lid body 110 together with the positive electrode current collector 120, that is, a state before the swaged portion 214 is formed (before swaging is performed).

Figure 9:
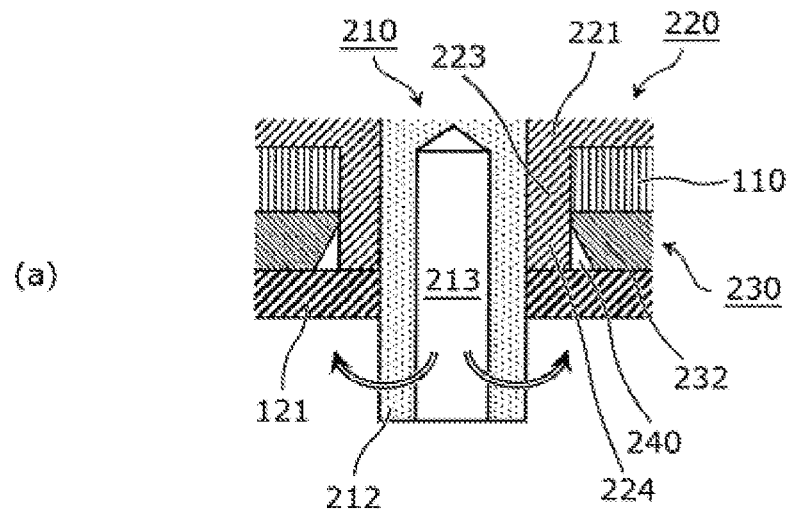
FIG. 9 is a cross-sectional view showing a step of fixing the positive electrode terminal according to the embodiment of the present invention to the lid body together with the positive electrode current collector.
Figure 9:
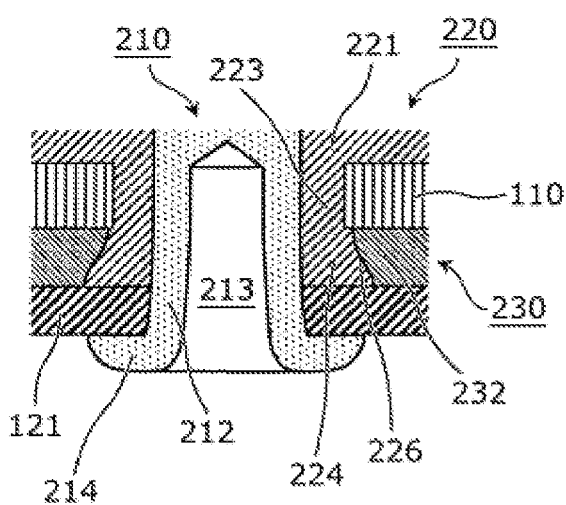
Figure 9:
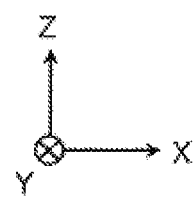

FIG. 9 is a cross-sectional view showing a step of fixing the positive electrode terminal 200 according to the embodiment of the present invention to the lid body 110 together with the positive electrode current collector 120. To be more specific, FIG. 9 is a cross-sectional view showing a step of forming the swaged portion 214 of the fixing portion 210 (a swaging step).

First, as shown in FIG. 8, in a disposing step, the cylindrical portion 223 of the first gasket 220 is disposed outside the columnar portion 212 of the fixing portion 210 and inside the lid body hole portion 112 of the lid body 110. Further, the cylindrical portion 223 is disposed in a state where the cylindrical portion 223 projects toward one end portion side of the fixing portion 210 (toward a minus side in the Z axis direction) from the surface 236 of the second gasket 230 on a container 100 side, and a space 240 is formed between the cylindrical portion 223 and the second gasket 230.

In other words, in the disposing step, the first gasket 220 and the second gasket 230 are disposed such that the first connecting portion 224 of the cylindrical portion 223 projects toward the swaged portion 214 from a contact surface between the inner surface 110b of the lid body 110 and the second gasket 230, and a space is defined by at least two of the first connecting portion 224, the second gasket 230, the positive electrode current collector 120, the inner surface 110b of the lid body 110, and the columnar portion 212. In this embodiment, the space 240 is a space defined by the cylindrical portion 223, the second gasket 230, and the terminal-side connecting portion 121 of the positive electrode current collector 120.

To be more specific, the first gasket 220 and the second gasket 230 are formed into shapes shown in FIG. 5 and FIG. 6 respectively, and are disposed as shown in FIG. 7. With such a configuration, the first gasket 220 and the second gasket 230 are disposed such that the space 240 is defined by at least the second gasket 230 and the positive electrode current collector 120 (formed at a position closer to the positive electrode current collector 120 than to the lid body 110). Further, the first gasket 220 and the second gasket 230 are disposed such that, in the normal direction of the lid body 110, the space 240 flares from a lid body 110 side to a positive electrode current collector 120 side (the closer to the positive electrode current collector 120 than to the lid body 110 the space 24 is disposed, the larger space 240 is formed).

That is, the through hole 235 which is formed in the second connecting portion 232 of the second gasket 230 has a shape where the through hole 235 is gradually flared downward and hence, by disposing the first connecting portion 224 of the cylindrical portion 223 in the through hole 235, the space 240 is formed around the first connecting portion 224.

As shown in FIG. 9, in a swaging step, by inserting the columnar portion 212 of the fixing portion 210 into the cylindrical portion 223 and by swaging one end portion of the fixing portion 210 (an end portion on a minus side in the Z axis direction), the swaged portion 214 which is brought into contact with the positive electrode current collector 120 is formed. With such an operation, as described previously, the first connecting portion 224 is formed such that, in the normal direction of the lid body 110, the outer diameter of the distal end portion of the first connecting portion 224 closest to the swaged portion 214 differs from an outer diameter of the proximal end portion of the first connecting portion 224 on a side opposite to the distal end portion.

That is, the space 213 in the fixing portion 210 is expanded on a swaged portion 214 side by such swaging and hence, the columnar portion 212 on the swaged portion 214 side is outwardly flared whereby the cylindrical portion 223 is pressed by the columnar portion 212 from the inside and air-tightness is enhanced. At this stage of operation, particularly, the first connecting portion 224 is pressed from the inside, and the first gasket 220 and the second gasket 230 are pressed also in the axis direction of the columnar portion 212 (in the Z axis direction) by swaging and hence, two gaskets are compressed so that the space 240 is closed. With such an operation, the boundary 260 is formed between the first gasket 220 and the second gasket 230.

The space 240 is formed on a swaged portion 214 side of the second connecting portion 232 and hence, as shown in FIG. 7, the first connecting portion 224 is formed such that the outer diameter of the distal end portion of the first connecting portion 224 is larger than the outer diameter of the proximal end portion of the first connecting portion 224.

As has been described heretofore, in the energy storage device 10 according to the embodiment of the present invention, the cylindrical portion 223 of the first gasket 220 has the first connecting portion 224 as an extension portion which extends toward the swaged portion 214 from the contact surface between the container 100 and the second gasket 230, and the first connecting portion 224 is formed such that the outer diameter of the distal end portion of the first connecting portion 224 on a swaged portion 214 side differs from the outer diameter of the proximal end portion of the first connecting portion 224. With such a configuration, it is understood that, at the time of fixing the positive electrode terminal 200 and the positive electrode current collector 120 to the container 100 by swaging, the gaskets are strongly pressed so that the first connecting portion 224 of the first gasket 220 slips into the space formed between the first gasket 220 and the second gasket 230. With such a configuration, it is possible to suppress the occurrence of a damage such as cracking of the gasket disposed between the container 100 and the positive electrode terminal 200 or between the container 100 and the positive electrode current collector 120.

Further, when the fixing portion 210 is swaged, the end portion of the columnar portion 121 on a swaged portion 214 side is formed into an outwardly flared shape. Accordingly, the first connecting portion 224 has a shape where the outer diameter of the distal end portion of the first connecting portion 224 is larger than the outer diameter of the proximal end portion of the first connecting portion 224 and hence, the flaring of the end portion of the fixing portion 210 can be accommodated thus suppressing the occurrence of a damage such as cracking of the gasket.

According to the method of manufacturing the energy storage device 10 of the embodiment of the present invention, the energy storage device 10 is manufactured such that the first connecting portion 224 of the first gasket 220 is disposed in a state where the space is formed between the first gasket 220 and the second gasket 230 in the disposing step, and the end portion of the fixing portion 210 is swaged in the swaging step. Due to the above-mentioned manufacturing method, the first connecting portion 224 is formed such that the outer diameter of the distal end portion of the first connecting portion 224 on a swaged portion 214 side differs from the outer diameter of the proximal end portion of the first connecting portion 224. Accordingly, even when the gaskets are strongly pressed in the swaging step, it is possible to allow the first connecting portion 224 of the first gasket 220 to slip into the space formed between the first gasket 220 and the second gasket 230. As a result, it is possible to suppress the occurrence of a damage such as cracking of the gasket disposed between the container 100 and the positive electrode terminal 200 or between the container 100 and the positive electrode current collector 120.

When the fixing portion 210 is swaged, the end portion of the columnar portion 212 on the positive electrode current collector 120 side is formed into an outwardly flared shape. Accordingly, by disposing the first gasket 220 and the second gasket 230 such that the space formed between the first gasket 220 and the second gasket 230 is defined by at least the second gasket 230 and the positive electrode current collector 120 (that is, such that the space faces the positive electrode current collector 120), the flaring of the end portion of the fixing portion 210 can be accommodated thus suppressing the occurrence of a damage such as cracking of the gasket.

By disposing the first gasket 220 and the second gasket 230 such that the space expands from the lid body 110 side to the positive electrode current collector 120 side, the flaring of the end portion of the fixing portion 210 can be further accommodated and hence, it is possible to further effectively suppress the occurrence of a damage such as cracking of the gasket.

The through hole 235 of the second connecting portion 232 is formed into a shape where a cross-sectional shape taken along a plane parallel to the XZ plane becomes a linear shape. However, the through hole 235 of the second connecting portion 232 may be formed into a shape such that a cross-sectional shape becomes a curved shape.

The above-mentioned configurations and advantageous effects are substantially equal to the configurations and advantageous effects on the negative electrode terminal 300 side. Further, also in the following modifications, configurations and advantageous effects on a positive electrode terminal 200 side are substantially equal to configurations and advantageous effects on a negative electrode terminal 300 side.

Modification 1

Next, a modification 1 of the above-mentioned embodiment is described. In this modification, a through hole formed in a second gasket is configured to gradually expand as the through hole extends upward.

Figure 10:
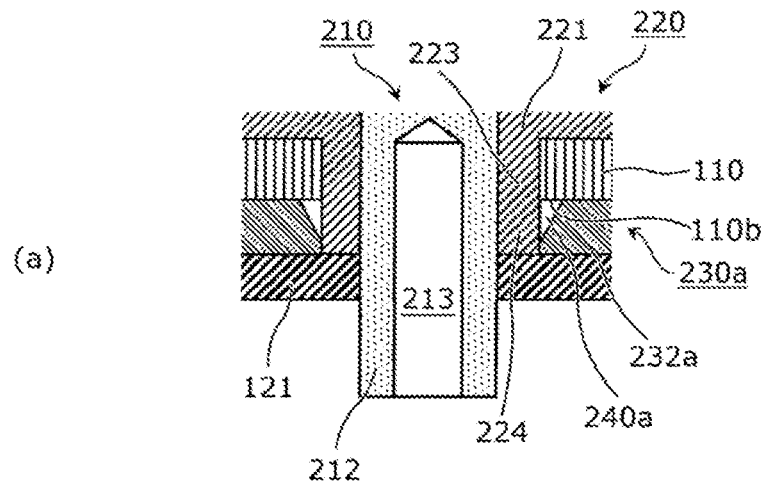
FIG. 10 is a cross-sectional view showing a step of fixing a positive electrode terminal according to a modification 1 of the embodiment of the present invention to a lid body together with a positive electrode current collector.
Figure 10:
Figure 10:
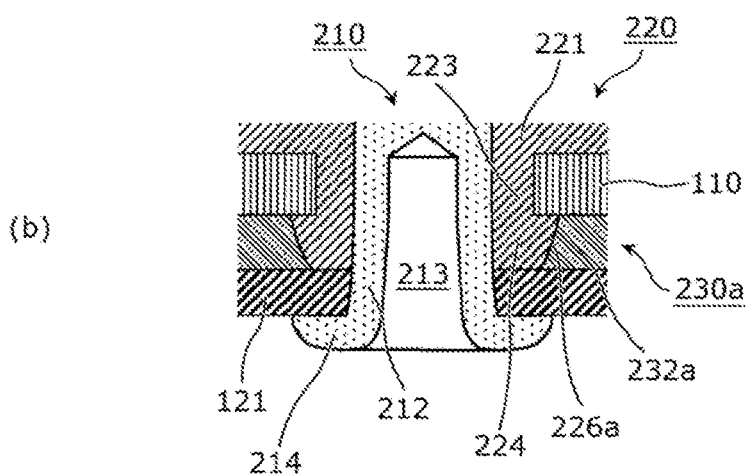
Figure 10:
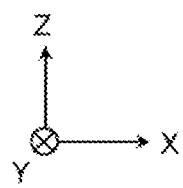

FIG. 10 is a cross-sectional view showing a step of fixing a positive electrode terminal 200 according to the modification 1 of the embodiment of the present invention to a lid body 110 together with a positive electrode current collector 120. To be more specific, FIG. 10 is a view which corresponds to FIG. 9.

First, as shown in FIG. 10(*a*), the energy storage device of this modification includes a second gasket 230*a* in place of the second gasket 230 which the energy storage device 10 of the above-mentioned embodiment includes. The second gasket 230*a* has a second connecting portion 232*a* in place of the second connecting portion 232 which the second gasket 230 in the above-mentioned embodiment has.

The second connecting portion 232*a* is formed into a shape where a lower portion has a circular cylindrical shape, and an inner diameter of the second connecting portion 232*a* is gradually increased toward an upper side from an upper end (an end on a plus side in the Z-axis direction) of the circular cylindrical shape. That is, the second connecting portion 232*a* has a through hole which is configured to gradually expand as the through hole extends upward. In other words, the second connecting portion 232*a* includes a thin wall portion whose thickness is gradually decreased toward the through hole. A cross-sectional shape of the through hole is not limited to a circular shape and may be an elliptical shape, a rectangular shape or the like.

With such a configuration, when a first connecting portion 224 of the cylindrical portion 223 is disposed in the though hole formed in the second connecting portion 232*a*, a space 240*a* is formed around the first connecting portion 224. In this modification, the space 240*a* is a space defined by the cylindrical portion 223, the second gasket 230*a* and an inner surface 110*b* of the lid body 110. That is, the space 240*a* is defined by at least any two out of the first connecting portion 224, the second gasket 230*a*, the positive electrode current collector 120, the inner surface 110*b* of the lid body 110, and a columnar portion 212.

As shown in FIG. 10(*b*), the first gasket 220 and the second gasket 230*a* are compressed by swaging so that the space 240*a* is closed by the first gasket 220 and the second gasket 230*a* whereby a boundary 226*a* is formed between the first gasket 220 and the second gasket 230*a*. Since the space 240*a* is formed on the lid body 110 side of the second connecting portion 232*a*, the boundary 226*a* is formed such that a distance between an end portion of the boundary 226*a* on the lid body 110 side and the columnar portion 212 is larger than a distance between the end portion of the boundary 226*a* on the swaged portion 214 side and the columnar portion 212. That is, the first connecting portion 224 is formed such that an outer diameter of a proximal end portion of the first connecting portion 224 is larger than an outer diameter of a distal end portion of the first connecting portion 224.

As described above, the energy storage device according to the modification 1 of the embodiment of the present invention can also acquire substantially the same advantageous effects as the above-mentioned embodiment.

Although the through hole formed in the second connecting portion 232a is formed such that a cross-sectional shape of the though hole taken along a plane parallel to an XZ plane is formed into a linear shape, the through hole formed in the second connecting portion 232a may be formed such that a cross-sectional shape of the though hole taken along a plane parallel to the XZ plane is formed into a curved shape.

Modification 2

Next, a modification 2 of the above-mentioned embodiment is described. In this modification, an outer surface of a first connecting portion of a first gasket is formed into a shape where the first gasket is gradually narrowed as the outer surface extends downward.

Figure 11:
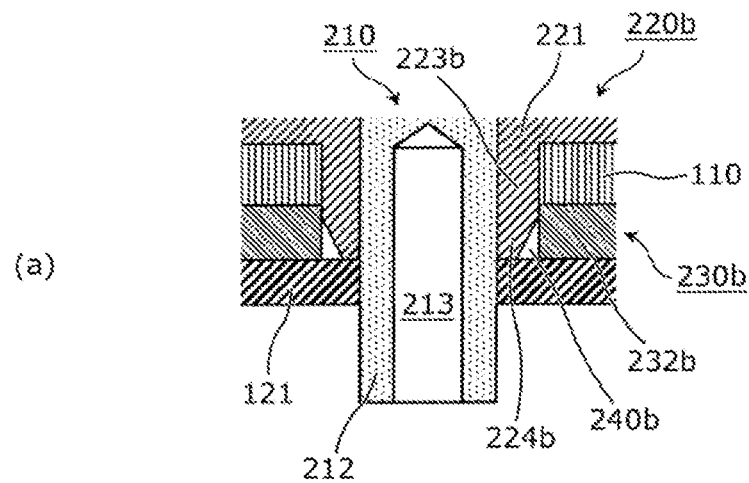
FIG. 11 is a cross-sectional view showing a step of fixing a positive electrode terminal according to a modification 2 of the embodiment of the present invention to a lid body together with a positive electrode current collector.
Figure 11:
Figure 11:
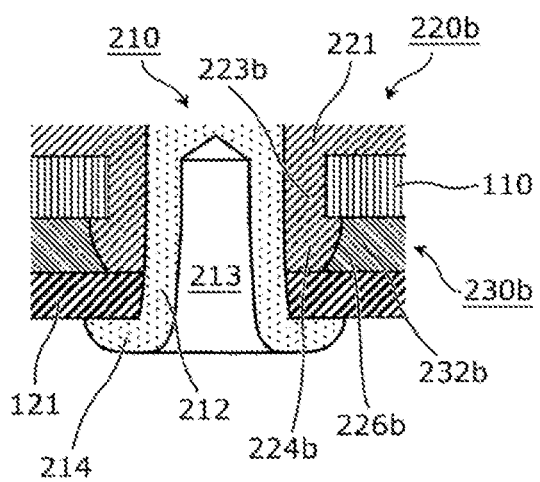
Figure 11:
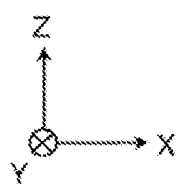

FIG. 11 is a cross-sectional view showing a step of fixing a positive electrode terminal 200 according to the modification 2 of the embodiment of the present invention to a lid body 110 together with a positive electrode current collector 120. To be more specific, FIG. 11 is a view which corresponds to FIG. 9.

First, as shown in FIG. 11(a), the energy storage device of this modification includes a first gasket 220b and a second gasket 230b in place of the first gasket 220 and the second gasket 230 which the energy storage device 10 of the above-mentioned embodiment includes. The first gasket 220b has a first connecting portion 224b of a cylindrical portion 223b in place of the first connecting portion 224 of the cylindrical portion 223 which the first gasket 220 in the above-mentioned embodiment has. The second gasket 230b has a second connecting portion 232b in place of the second connecting portion 232 which the second gasket 230 in the above-mentioned embodiment has.

The first connecting portion 224b is formed into a shape where an upper portion has a circular cylindrical shape, and an outer surface of the first connecting portion 224b is gradually narrowed toward a lower side from a lower end (an end on a minus side in the Z-axis direction) of the circular cylindrical shape. In other words, the first connecting portion 224b includes a thin wall portion whose thickness is gradually decreased toward the lower end. A cross-sectional shape of the outer surface of the first connecting portion 224b is not limited to a circular shape and may be an elliptical shape, a rectangular shape or the like. Further, the second connecting portion 232b has a through hole having a circular columnar shape.

With such a configuration, when the first connecting portion 224b is disposed in the though hole formed in the second connecting portion 232b, a space 240b is formed around the first connecting portion 224b. In this modification, the space 240b is a space defined by the cylindrical portion 223b, the second gasket 230b and a terminal-side connecting portion 121 of a positive electrode current collector 120.

As shown in FIG. 11(b), the first gasket 220b and the second gasket 230b are compressed by swaging so that the space 240b is closed by the first gasket 220b and the second gasket 230b whereby a boundary 226b is formed between the first gasket 220b and the second gasket 230b. Since the space 240b is formed on a swaged portion 214 side of the first connecting portion 224b, the boundary 226b is formed such that a distance between an end portion of the boundary 226b on the lid body 110 side and the columnar portion 212 is larger than a distance between the end portion of the boundary 226b on the swaged portion 214 side and the columnar portion 212. That is, the first connecting portion 224b is formed such that an outer diameter of a proximal end portion of the first connecting portion 224b is larger than an outer diameter of a distal end portion of the first connecting portion 224b.

As described above, the energy storage device according to the modification 2 of the embodiment of the present invention can also acquire substantially the same advantageous effects as the above-mentioned embodiment.

Although the outer surface of the first connecting portion 224b is formed such that a cross-sectional shape of the outer surface of the first connecting portion 224b taken along a plane parallel to an XZ plane is formed into a linear shape, the outer surface of the first connecting portion 224b may be formed such that a cross-sectional shape of the outer surface of the first connecting portion 224b taken along a plane parallel to the XZ plane is formed into a curved shape.

The first connecting portion 224b may have the configuration which is vertically reversed compared to the configuration of the first connecting portion 224b in the above-mentioned modification. That is, the first connecting portion 224b may be formed into a shape where a lower portion has a circular cylindrical shape, and an outer surface of the first connecting portion 224b is gradually narrowed toward an upper side from an upper end of the circular cylindrical shape.

Modification 3

Next, a modification 3 of the above-mentioned embodiment is described. In this modification, a recessed portion is formed on a lower portion of a second connecting portion of a second gasket.

Figure 12:
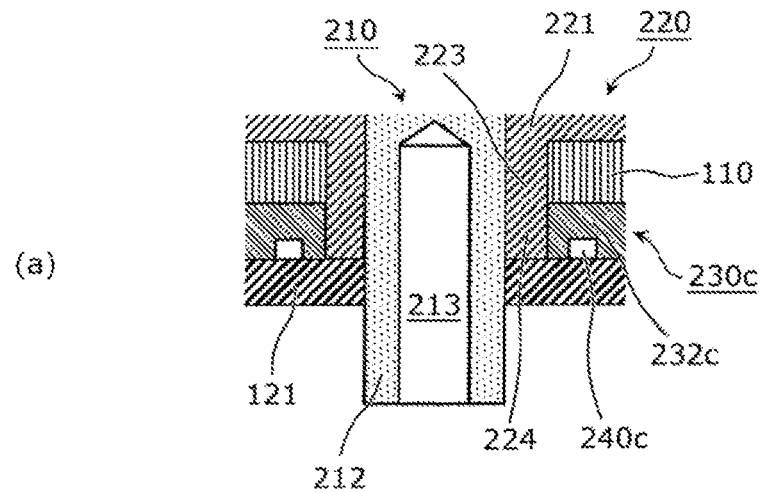
FIG. 12 is a cross-sectional view showing a step of fixing a positive electrode terminal according to a modification 3 of the embodiment of the present invention to a lid body together with a positive electrode current collector.
Figure 12:
Figure 12:
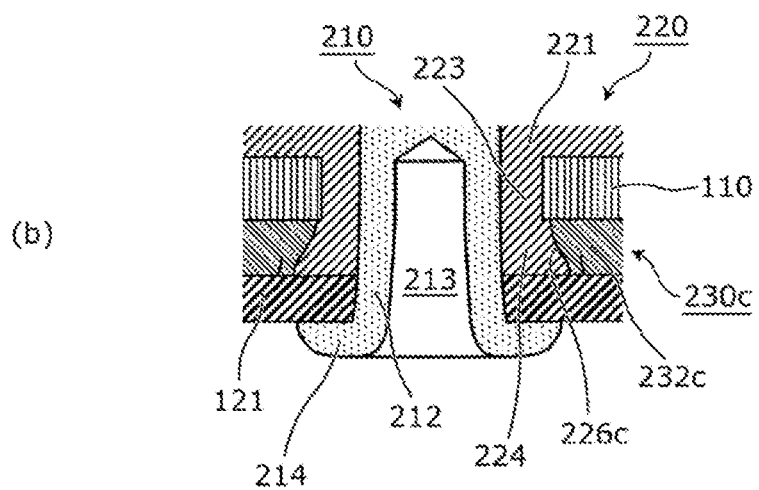
Figure 12:
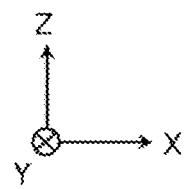

FIG. 12 is a cross-sectional view showing a step of fixing a positive electrode terminal 200 according to the modification 3 of the embodiment of the present invention to a lid body 110 together with a positive electrode current collector 120. To be more specific, FIG. 12 is a view which corresponds to FIG. 9.

First, as shown in FIG. 12(a), the energy storage device of this modification includes a second gasket 230c in place of the second gasket 230 which the energy storage device 10 of the above-mentioned embodiment includes. The second gasket 230c has a second connecting portion 232c in place of the second connecting portion 232 which the second gasket 230 in the above-mentioned embodiment has.

A through hole having a circular columnar shape is formed in the second connecting portion 232c, and an annular recessed portion is formed on a lower portion (on a surface on a minus side in the Z axis direction) of the second connecting portion 232c such that the annular recessed portion is disposed so as to surround the through hole. In other words, the second connecting portion 232c includes a thin wall portion around the through hole. A cross-sectional shape of the recessed portion is not limited to a rectangular shape, and may be a triangular shape, an arcuate shape or the like.

With such a configuration, when a first connecting portion 224 of the cylindrical portion 223 is disposed in the though hole formed in the second connecting portion 232c, a space 240c is formed around the first connecting portion 224. In this modification, the space 240c is a space defined by the second gasket 230c and a terminal-side connecting portion 121 of a positive electrode current collector 120.

As shown in FIG. 12(b), the first gasket 220 and the second gasket 230c are compressed by swaging so that the space 240c is closed by the first gasket 220 and the second gasket 230c whereby a boundary 226c is formed between the first gasket 220 and the second gasket 230c. Since the space 240c is formed on a swaged portion 214 side of the second connecting portion 232c, the boundary 226c is formed such that a distance between an end portion of the boundary 226c on the swaged portion 214 side and the columnar portion 212 is larger than a distance between the end portion of the boundary 226c on a lid body 110 side and the columnar portion 212. That is, the first connecting portion 224 is formed such that an outer diameter of a distal end portion of the first connecting portion 224 is larger than an outer diameter of a proximal end portion of the first connecting portion 224.

As described above, the energy storage device according to the modification 3 of the embodiment of the present invention can also acquire substantially the same advantageous effects as the above-mentioned embodiment.

An annular recessed portion may be formed on an upper portion (on a surface on a plus side in the Z axis direction) of the second connecting portion 232c.

Modification 4

Next, a modification 4 of the above-mentioned embodiment is described. In this modification, a recessed portion is formed on a first connecting portion of a first gasket such that an inner surface of the first connecting portion is recessed.

Figure 13:
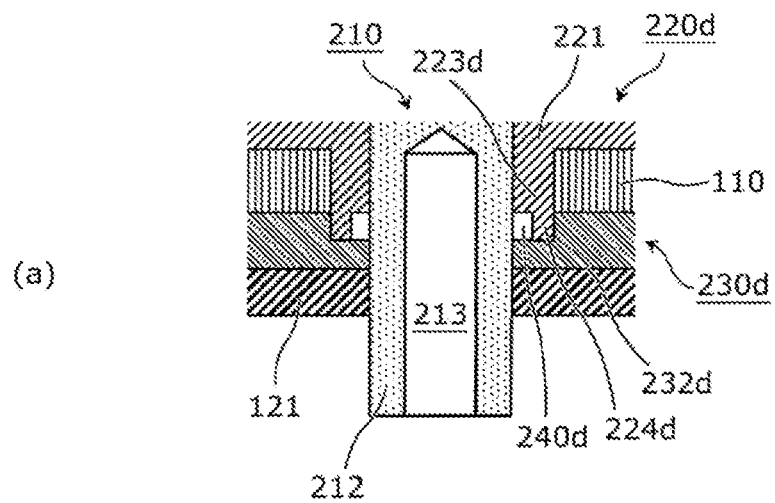
FIG. 13 is a cross-sectional view showing a step of fixing a positive electrode terminal according to a modification 4 of the embodiment of the present invention to a lid body together with a positive electrode current collector.
Figure 13:
Figure 13:
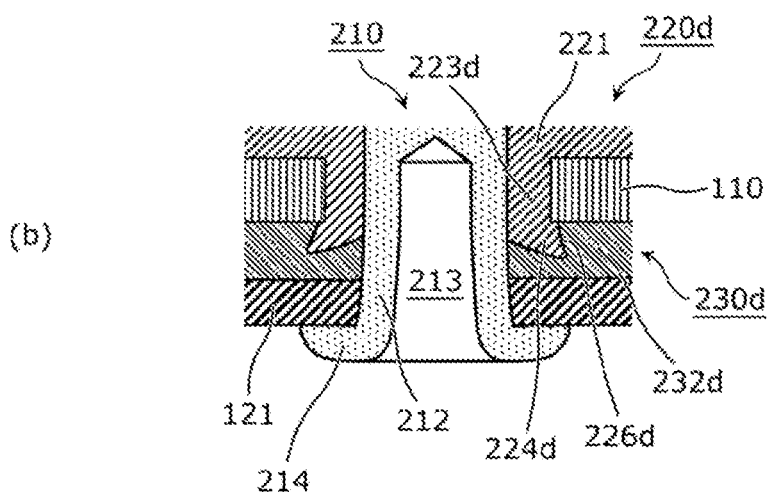
Figure 13:
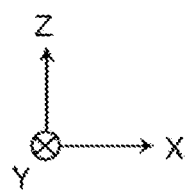

FIG. 13 is a cross-sectional view showing a step of fixing a positive electrode terminal 200 according to the modification 4 of the embodiment of the present invention to a lid body 110 together with a positive electrode current collector 120. To be more specific, FIG. 13 is a view which corresponds to FIG. 9.

First, as shown in FIG. 13(a), the energy storage device of this modification includes a first gasket 220d and a second gasket 230d in place of the first gasket 220 and the second gasket 230 which the energy storage device 10 of the above-mentioned embodiment includes. The first gasket 220d has a first connecting portion 224d of a cylindrical portion 223d in place of the first connecting portion 224 of the cylindrical portion 223 which the first gasket 220 in the above-mentioned embodiment has. The second gasket 230d has a second connecting portion 232d in place of the second connecting portion 232 which the second gasket 230 in the above-mentioned embodiment has.

A recessed portion recessed in a stepwise manner is formed on an inner surface of a lower portion of the first connecting portion 224d. In other words, the first connecting portion 224d includes a thin wall portion formed by increasing a diameter of an inner surface on a distal end portion thereof. A through hole having a circular columnar shape is formed in the second connecting portion 232d, and a recessed portion which has an upper surface thereof recessed in a stepwise manner is formed on the second connecting portion 232d such that the recessed portion is disposed so as to cover the periphery of the columnar portion 212 and to be disposed around the through hole. In other words, the second connecting portion 232d includes a thin wall portion formed around the columnar portion 212.

With such a configuration, when the first connecting portion 224d is disposed on an upper surface of the thin wall portion of the second connecting portion 232d, a space 240d is formed around the columnar portion 212. In this modification, the space 240d is a space defined by the cylindrical portion 223d, the second gasket 230d and the columnar portion 212.

As shown in FIG. 13(b), the first gasket 220d and the second gasket 230d are compressed by swaging so that the space 240d is closed by the first gasket 220d and the second gasket 230d whereby a boundary 226d is formed between the first gasket 220d and the second gasket 230d. Since the space 240d is formed closer to a lid body 110 side than a swaged portion 214, the boundary 226d is formed such that a distance between an end portion of the boundary 226d on the swaged portion 214 side and the columnar portion 212 is larger than a distance between the end portion of the boundary 226d on the lid body 110 side and the columnar portion 212. That is, the first connecting portion 224d is formed such that an outer diameter of a distal end portion of the first connecting portion 224d is larger than an outer diameter of a proximal end portion of the first connecting portion 224d.

As described above, the energy storage device according to the modification 4 of the embodiment of the present invention can also acquire substantially the same advantageous effects as the above-mentioned embodiment.

Although an outer edge of the recessed portion formed on the first connecting portion 224d or the second connecting portion 232d is formed such that a cross-sectional shape of the outer edge taken along a plane parallel to an XZ plane is formed into a linear shape, the outer edge may be formed such that a cross-sectional shape of the outer edge taken along a plane parallel to the XZ plane is formed into a curved shape.

A recessed portion which is recessed in a stepwise manner may be formed on an outer surface of a lower portion of the first connecting portion 224d. That is, the first connecting portion 224d may have a thin wall portion formed by narrowing a diameter of an outer surface on a distal end portion thereof.

Modification 5

Next, a modification 5 of the above-mentioned embodiment is described. In this modification, a through hole formed in a second gasket is configured to largely expand as the through hole extends downward.

Figure 14:
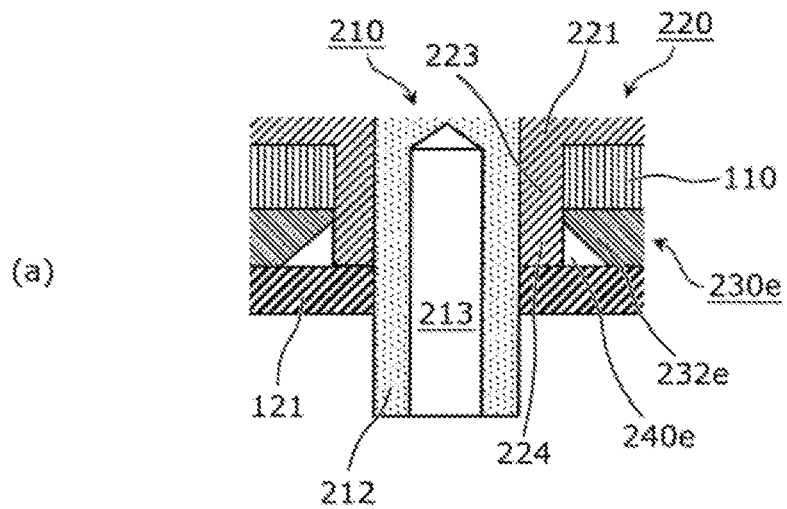
FIG. 14 is a cross-sectional view showing a step of fixing a positive electrode terminal according to a modification 5 of the embodiment of the present invention to a lid body together with a positive electrode current collector.
Figure 14:
Figure 14:
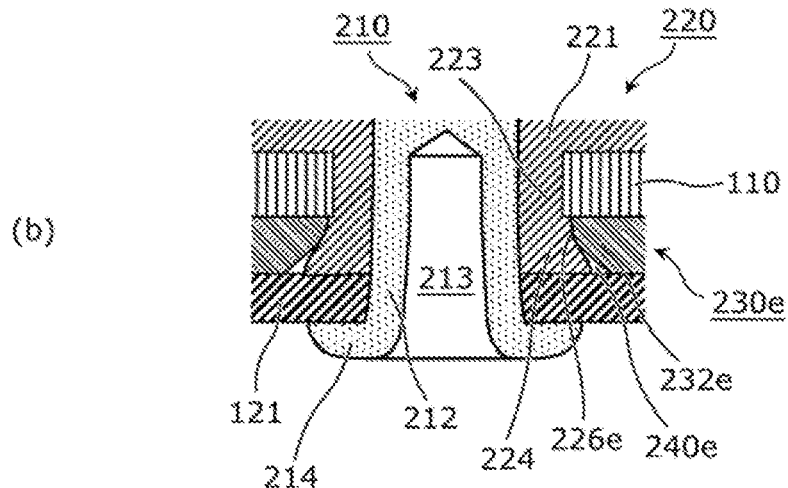
Figure 14:
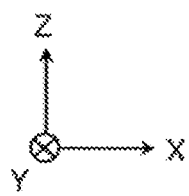

FIG. 14 is a cross-sectional view showing a step of fixing a positive electrode terminal 200 according to the modification 5 of the embodiment of the present invention to a lid body 110 together with a positive electrode current collector 120. To be more specific, FIG. 14 is a view which corresponds to FIG. 9.

First, as shown in FIG. 14(a), the energy storage device of this modification includes a second gasket 230e in place of the second gasket 230 which the energy storage device 10 of the above-mentioned embodiment includes. The second gasket 230e has a second connecting portion 232e in place of the second connecting portion 232 which the second gasket 230 in the above-mentioned embodiment has.

The second connecting portion 232e is formed into a shape where an upper portion has a circular cylindrical shape, and an inner diameter of the second connecting portion 232e is largely increased (becomes larger than the second connecting portion 232 in the above-mentioned embodiment) toward a lower side from a lower end (an end on a minus side in the Z axis direction) of the circular cylindrical shape. With such a configuration, a large space 240e is formed around the first connecting portion 224. In this modification, the space 240e is a space defined by the cylindrical portion 223, the second gasket 230e and a terminal-side connecting portion 121 of a positive electrode current collector 120.

As shown in FIG. 14(b), in the same manner as the above-mentioned embodiment, a boundary 226e is formed between the first gasket 220 and the second gasket 230e. The boundary 226e is formed such that a distance between an end portion of the boundary 226e on a swaged portion 214 side and a columnar portion 212 is larger than a distance between the end portion of the boundary 226e on a lid body 110 side and the columnar portion 212. That is, the first connecting portion 224 is formed such that an outer diameter of a distal end portion of the first connecting portion 224 is larger than an outer diameter of a proximal end portion of the first connecting portion 224.

Since the space 240e is a large space before swaging is performed, the space 240e is not closed even when swaging is performed and a small space remains even after swaging is performed. That is, the first connecting portion 224 which forms an extension portion of the cylindrical portion 223 is disposed adjacently to the space 240e formed between the first connecting portion 224 and the second gasket 230e. In other words, the cylindrical portion 223 is formed such that a boundary 226 with the second gasket 230e is disposed adjacently to the space 240e.

As described above, the energy storage device according to the modification 5 of the embodiment of the present invention can also acquire substantially the same advantageous effects as the above-mentioned embodiment. Particularly, the first connecting portion 224 is formed so as to be disposed adjacently to the space formed between the first connecting portion 224 and the second gasket 230. Accordingly, even when the gasket is strongly pressed by swaging, it is possible to ensure a place into which the gasket slips. With such a configuration, it is possible to suppress the occurrence of a damage such as cracking of the gasket.

Hereinafter, as in the case of this modification 5, the description is made by exemplifying various modifications with respect to the configuration where a space is formed between a first gasket and a second gasket. Particularly, in the modifications exemplified hereinafter, at least one of a first gasket (a first connecting portion which forms an extension portion) and a second gasket includes a thin wall portion having smaller thickness than other portions, and a space is formed at a portion disposed adjacently to the thin wall portion.

Modification 6

Next, a modification 6 of the above-mentioned embodiment is described.

Figure 15:
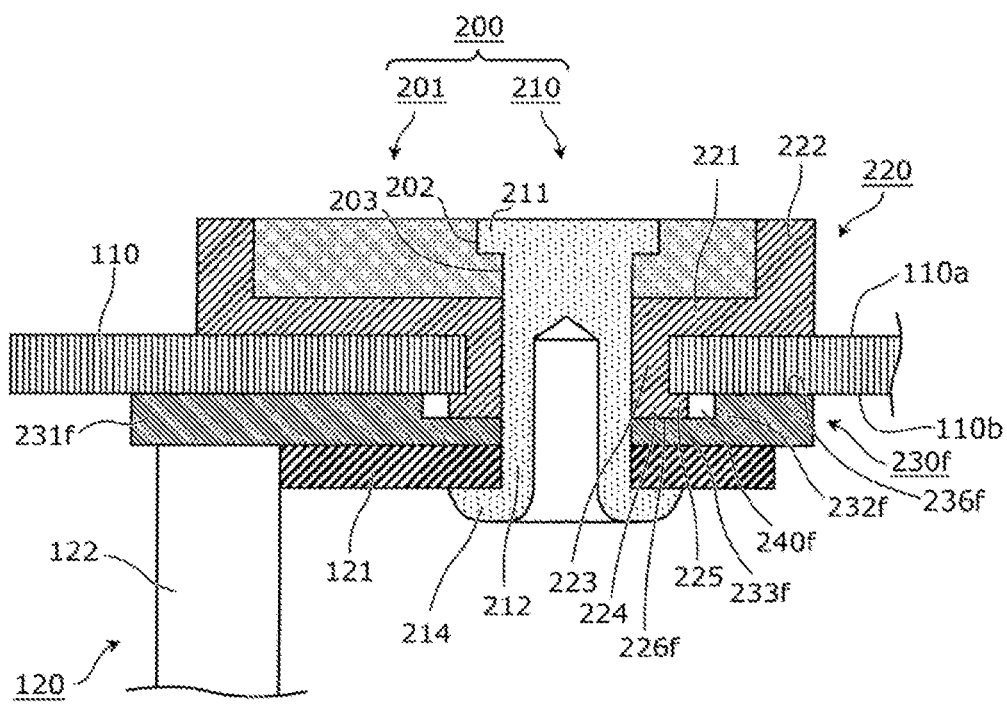
FIG. 15 is a cross-sectional view showing a configuration where a positive electrode terminal according to a modification 6 of the embodiment of the present invention is fixed to a lid body together with a positive electrode current collector.
Figure 15:
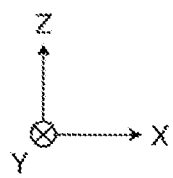

FIG. 15 is a cross-sectional view showing a configuration where a positive electrode terminal 200 according to the modification 6 of the embodiment of the present invention is fixed to a lid body 110 together with a positive electrode current collector 120. To be more specific, FIG. 15 is a view which corresponds to FIG. 7.

Figure 16:
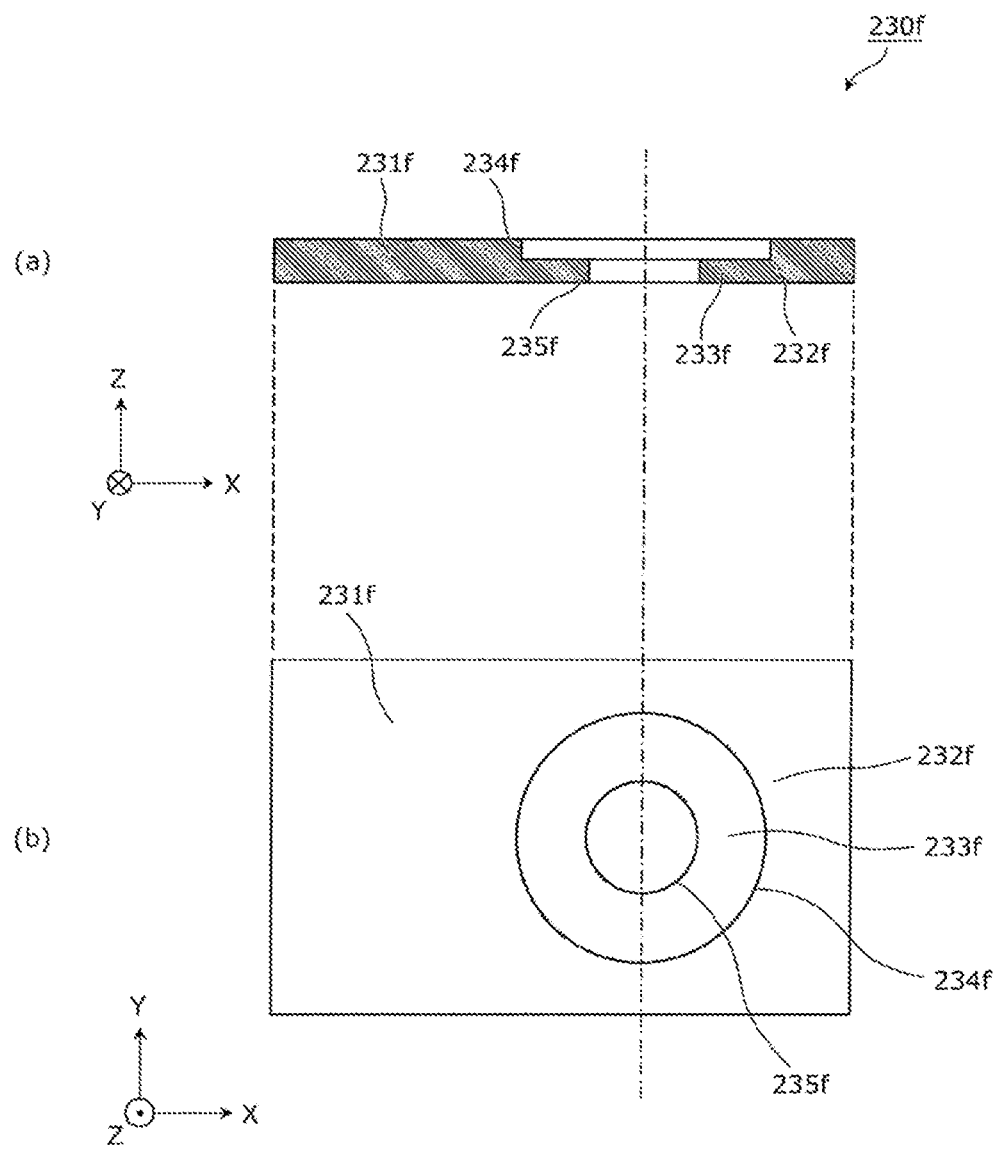
FIG. 16 is a view showing a configuration of a second gasket according to a modification 6 of the embodiment of the present invention.

FIG. 16 is a view showing a configuration of a second gasket 230f according to the modification 6 of the embodiment of the present invention. To be more specific, FIG. 16(a) is a cross-sectional view of the second gasket 230f (a view of the second gasket 230f before being assembled with the respective constitutional elements), and FIG. 16(b) is a plan view when the second gasket 230f is viewed from above (a plus side in the Z axis direction).

As shown in FIG. 15, the energy storage device of this modification includes a second gasket 230f in place of the second gasket 230 which the energy storage device 10 of the above-mentioned embodiment includes. In a first gasket 220 of this modification, although a length of a cylindrical portion 223 is set slightly shorter compared to the first gasket 220 in the above-mentioned embodiment, other constitutions of the storage device of this modification are equal to the corresponding constitutions of the above-mentioned embodiment and hence, the same symbols are given to the identical parts, and the detailed description of other constitutions is omitted.

Further, as shown in FIG. 16, the second gasket 230f has a rectangular flat-plate-like flat plate portion 231f, and a second connecting portion 232f disposed on an inner side of the flat plate portion 231f. The second connecting portion 232f is a portion connected to the first connecting portion 224 of the first gasket 220, and has a through hole 235f. The second connecting portion 232f includes a thin wall portion 233f around the through hole 235f.

The through hole 235f is a circular opening portion in which the fixing portion 210 of the positive electrode terminal 200 is disposed. That is, the columnar portion 212 of the fixing portion 210 is inserted into the through hole 235f. The thin wall portion 233f is a portion having a smaller thickness than other portions of the second connecting portion 232f.

That is, in the second connecting portion 232f, the thin wall portion 233f having a circular annular shape (doughnut shape) is formed around the through hole 235f so that a recessed portion 234f having a circular cross section is formed around the through hole 235f. The first connecting portion 224 of the cylindrical portion 223 of the first gasket 220 is disposed in the recessed portion 234f.

A cross-sectional shape of the through hole 235f is not limited to the circular shape, and may be an elliptical shape, a rectangular shape or the like. A cross-sectional shape of the recessed portion 234f is also not limited to the circular shape, and may be an elliptical shape, a rectangular shape or the like. Although the thin wall portion 233f is formed on the second connecting portion 232f in this embodiment, the thin wall portion 233f may be formed on the first connecting portion 224.

Further, as shown in FIG. 15, the thin wall portion 233f is disposed between a container 100 and a positive electrode current collector 120, and a space 240f is formed at a position adjacent to the thin wall portion 233f. The space 240f is disposed adjacently to the first connecting portion 224 and the second connecting portion 232f or is disposed around (outside) the fixing portion 210.

To be more specific, the space 240f is disposed adjacently to the first connecting portion 224 which forms a distal end portion of the cylindrical portion 223, and is disposed adjacently to an inner surface of an opening portion (an inner surface of the recessed portion 234f) formed on the second connecting portion 232f. That is, the space 240f is disposed adjacently to an outer surface of the first connecting portion 224 and the inner surface of the opening portion of the second connecting portion 232f such that the space 240f is sandwiched between the first connecting portion 224 and the second connecting portion 232f.

The space 240f is disposed adjacently to a lower surface of the lid body 110 and an upper surface of the thin wall portion 233f such that the space 240f is sandwiched between the lid body 110 and the thin wall portion 233f. That is, the space 240f is a space surrounded by the outer surface of the first connecting portion 224, the inner surface of the opening portion of the second connecting portion 232f, the lower surface of the lid body 110, and the upper surface of the thin wall portion 233f. In this manner, the opening portion into which the cylindrical portion 223 is inserted is formed in the second gasket 230f, and the inner peripheral surface of the opening portion partially forms the space.

In other words, the cylindrical portion 223 is disposed in a projecting manner toward the swaged portion 214 side from the surface 236f of the second gasket 230f on the lid body 110 side so that a boundary 226f with the second gasket 230f is formed adjacently to the space 240f. That is, the first connecting portion 224 is inserted into the recessed portion 234f formed by the thin wall portion 233f, and is brought into contact with the thin wall portion 233f, and the space 240f is formed around the first connecting portion 224. In this modification, the space 240f is a space defined by the cylindrical portion 223, the second gasket 230f and an inner surface 110b of the lid body 110.

An accommodating portion 225 is formed on a distal end portion of the first connecting portion 224 of the first gasket 220. That is, when a terminal body portion 201 and a positive electrode current collector 120 are swaged to each other by a fixing portion 210, the first gasket 220 and the second gasket 230f are pressed to each other and hence, there is a case where a portion of the first connecting portion 224 of the first gasket 220 or a portion of the second connecting portion 232f of the second gasket 230f slips into the space 240f. The accommodating portion 225 is a portion formed due to slipping of the first connecting portion 224 of the first gasket 220 into the space 240f.

To be more specific, the accommodating portion 225 is disposed between the lid body 110 and the thin wall portion 233f of the second gasket 230f. That is, the first gasket 220 is disposed so as to sandwich the lid body 110 with the flat plate portion 221 and the accommodating portion 225.

In this manner, by forming the accommodating portion 225 in the first connecting portion 224 of the first gasket 220, it is possible to make the removal of the first gasket 220 from the lid body 110 difficult or to enhance airtightness. Although there may be a case where such an accommodating portion 225 is formed also in other embodiments described hereinafter, in modifications 7 to 12 described hereinafter, for the sake of brevity of the description, the illustration and the description are made while omitting the accommodating portion 225.

The energy storage device of this modification can be also manufactured in the same manner as the above-mentioned embodiment. That is, in the disposing step, the first gasket 220 and the second gasket 230f are disposed such that the first connecting portion 224 of the cylindrical portion 223 projects toward the swaged portion 214 from the contact surface between the inner surface 110b of the lid body 110 and the second gasket 230f, and the space 240f is formed between the connecting portion 224 and the second gasket 230f.

In the swaging step, the columnar portion 212 of the fixing portion 210 is inserted into the cylindrical portion 223, and one end portion (the end portion on a minus side in the Z axis direction) of the fixing portion 210 is swaged thus forming the swaged portion 214 which is brought into contact with the positive electrode current collector 120. In the swaging step, the cylindrical portion 223 is formed such that the boundary 226f is disposed adjacently to the space 240f. That is, the first connecting portion 224 is formed so as to be disposed adjacently to the space 240f formed between the first connecting portion 224 and the second gasket 230f.

As has been described above, according to the energy storage device of the modification 6 of the embodiment of the present invention, the thin wall portion 233f is formed on at least one connecting portion (the second connecting portion 232f in this embodiment) out of the connecting portion with the first gasket 220 disposed between the positive electrode terminal 200 and the container 100 and the connecting portion with the second gasket 230f between the positive electrode current collector 120 and the container 100 and the space 240f is formed adjacently to the thin wall portion 233f. Accordingly, the space 240f is formed adjacently to the thin wall portion 233f of the connecting portion and hence, even when the gasket is strongly pressed by swaging with rivets or the like at the time of fixing the positive electrode terminal 200 and the positive electrode current collector 120 to the container 100, it is possible to ensure a place into which the connecting portion slips. With such a configuration, it is possible to suppress the occurrence of a damage such as cracking of the gasket disposed between the container 100 and the positive electrode terminal 200 or between the container 100 and the positive electrode current collector 120.

Further, the space 240f is disposed adjacently to the first connecting portion 224 of the first gasket 220 and the second connecting portion 232f of the second gasket 230f. That is, the space 240f which forms a place into which the connecting portion slips when the gasket is strongly pressed can be formed by the wall surface (outer peripheral surface) of the first connecting portion 224 and the wall surface (an inner peripheral surface of the opening portion) of the second connecting portion 232f and hence, the space 240f can be easily formed.

Further, the space 240f is disposed adjacently to the inner surface of the opening portion formed on the second connecting portion 232f. That is, the space 240f which forms a place into which the connecting portion slips when the gasket is strongly pressed can be formed by the inner surface of the opening portion and hence, the space 240f can be easily formed.

The thin wall portion 233f of the gasket is disposed between the container 100 and the positive electrode current collector 120 and hence, even when burrs formed at the time of working remain in the container 100 or the like, it is possible to suppress short-circuiting between the container 100 and the positive electrode current collector 120 caused by sandwiching of the thin wall portion 233f between the burrs and the positive electrode current collector 120.

Further, the energy storage device is configured such that the first gasket 220 and the second gasket 230f are disposed between the terminal body portion 201 and the positive electrode current collector 120, and the terminal body portion 201 and the positive electrode current collector 120 are fixed to the container 100 by the fixing portion 210, and the space 240f is disposed around the fixing portion 210. That is, although the first gasket 220 and the second gasket 230f are pressed at the time of sandwiching the terminal body portion 201 and the positive electrode current collector 120 by the fixing portion 210, since the space 240f is formed around the fixing portion 210, it is possible to ensure a place into which the connecting portion slips when the gasket is pressed. With such a configuration, it is possible to suppress the occurrence of a damage such as cracking of the gasket disposed between the container 100 and the positive electrode terminal 200 or between the container 100 and the positive electrode current collector 120.

Further, the first gasket 220 includes the cylindrical portion 223 outside the fixing portion 210 and inside the opening portion of the container 100, and the space 240f is disposed adjacently to the distal end portion of the cylindrical portion 223. With such a configuration, it is possible to suppress the occurrence of a damage such as cracking of the gasket by ensuring a place into which the cylindrical portion 223 slips when the first gasket 220 is pressed.

Further, the space 240*f* is disposed adjacently to an outer surface of the first connecting portion 224 of the distal end portion of the cylindrical portion 223 of the first gasket 220 and an inner surface of the opening portion of the second connecting portion 232*f* of the second gasket 230*f*. That is, the space 240*f* which forms a place into which the cylindrical portion 223 slips when the gasket is strongly pressed can be formed by the outer surface of the distal end portion of the cylindrical portion 223 of the first gasket 220 and the inner surface of the opening portion of the second gasket 230*f* and hence, the space 240*f* can be easily formed.

Modification 7

Next, a modification 7 of the above-mentioned embodiment is described. In this modification, a space is formed at a position different from the position where the space is formed in the modification 6.

Figure 17:
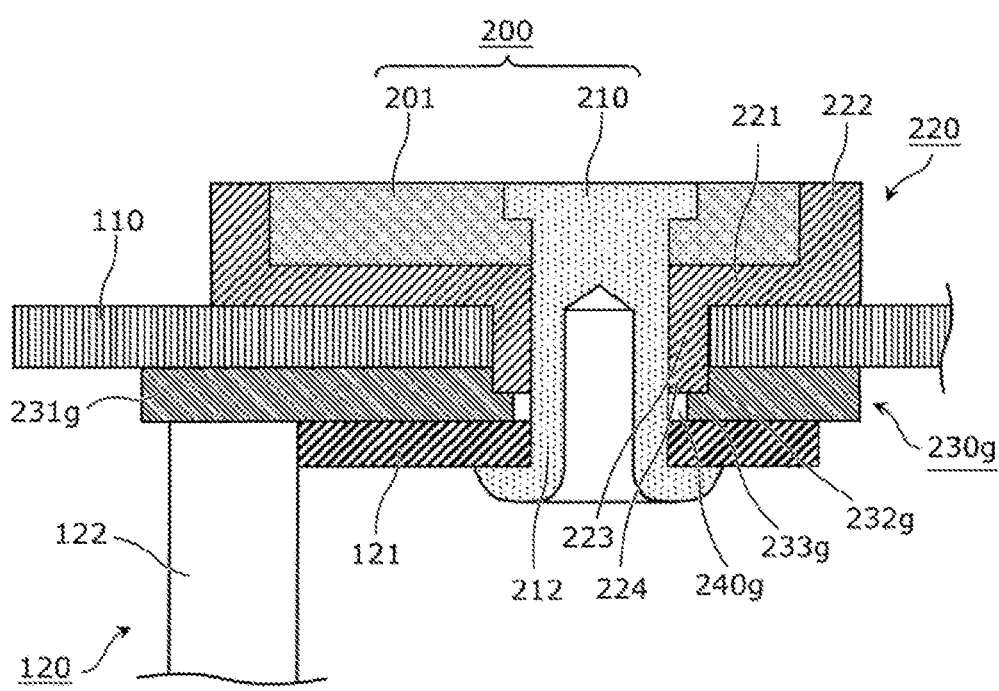
FIG. 17 is a cross-sectional view showing a configuration where a positive electrode terminal according to a modification 7 of the embodiment of the present invention is fixed to a lid body together with a positive electrode current collector.
Figure 17:
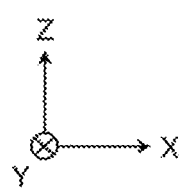

FIG. 17 is a cross-sectional view showing the configuration where a positive electrode terminal 200 according to the modification 7 of the embodiment of the present invention is fixed to a lid body 110 together with a positive electrode current collector 120. To be more specific, FIG. 17 is a view which corresponds to FIG. 15.

As shown in FIG. 17, the energy storage device of this modification includes a second gasket 230*g* in place of the second gasket 230*f* which the energy storage device of the above-mentioned modification 6 includes. The second gasket 230*g* includes a flat plate portion 231*g* and a second connecting portion 232*g*, and the second connecting portion 232*g* includes a thin wall portion 233*g*.

In such a configuration, an opening portion having an inner diameter larger than an outer diameter of a columnar portion 212 of a fixing portion 210 is formed in the second connecting portion 232*g*. Accordingly, a space 240*g* is disposed around the fixing portion 210. That is, the space 240*g* is disposed adjacently to an outer surface of the fixing portion 210 and an inner surface of the opening portion of the second connecting portion 232*g*.

To be more specific, the space 240*g* is a space surrounded by the outer surface of the fixing portion 210, the inner surface of the opening portion of the second connecting portion 232*g*, the lower surface of the first connecting portion 224 of the first gasket 220, and the upper surface of the terminal-side connecting portion 121 of the positive electrode current collector 120.

As described above, the energy storage device according to the modification 7 of the embodiment of the present invention can also acquire substantially the same advantageous effects as the above-mentioned modification 6. Particularly, the space 240*g* is disposed adjacently to the outer surface of the fixing portion 210 and the inner surface of the opening portion of the second connecting portion 232*g*. That is, the space 240*g* which forms a place into which the connecting portion slips when the gasket is strongly pressed can be formed by the outer surface of the fixing portion 210 and the inner surface of the opening portion of the second gasket 230*g* and hence, the space 240*g* can be easily formed.

Modification 8

Next, a modification 8 of the above-mentioned embodiment is described. In this modification, a first connecting portion of a first gasket includes a thin wall portion unlike the modification 6.

Figure 18:
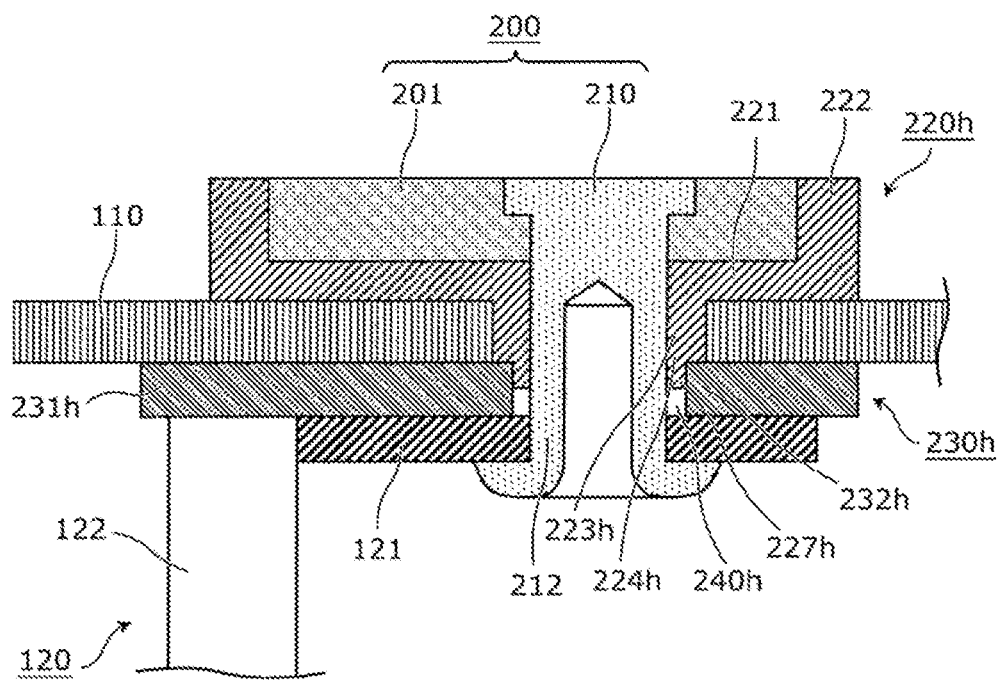
FIG. 18 is a cross-sectional view showing a configuration where a positive electrode terminal according to a modification 8 of the embodiment of the present invention is fixed to a lid body together with a positive electrode current collector.
Figure 18:
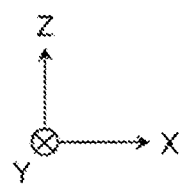

FIG. 18 is a cross-sectional view showing the configuration where a positive electrode terminal 200 according to the modification 8 of the embodiment of the present invention is fixed to a lid body 110 together with a positive electrode current collector 120. To be more specific, FIG. 18 is a view which corresponds to FIG. 15.

As shown in FIG. 18, the energy storage device of this modification includes a first gasket 220*h* and a second gasket 230*h* in place of the first gasket 220 and the second gasket 230*f* which the energy storage device of the above-mentioned modification 6 includes.

The first gasket 220*h* includes a cylindrical portion 223*h*, and a first connecting portion 224*h* is disposed on a distal end portion of the cylindrical portion 223*h*. Further, the first connecting portion 224*h* includes a thin wall portion 227*h* having a smaller thickness than other portions.

The second gasket 220*h* includes a flat plate portion 231*h* and a second connecting portion 232*h*. An opening portion having an inner diameter larger than an outer diameter of a columnar portion 212 of a fixing portion 210 is formed in the second connecting portion 232*h*. Accordingly, a space 240*h* is disposed around the fixing portion 210. That is, the space 240*h* is disposed adjacently to an outer surface of the fixing portion 210 and an inner surface of the opening portion of the second connecting portion 232*h*. A thin wall portion is not formed on the second connecting portion 232*h*.

To be more specific, the space 240*h* is a space surrounded by an outer surface of the fixing portion 210, the inner surface of the opening portion of the second connecting portion 232*h*, a lower surface of the thin wall portion 227*h* of the first connecting portion 224*h*, and an upper surface of a terminal side connecting portion 121 of the positive electrode current collector 120.

As has been described above, the energy storage device according to the modification 8 of the embodiment of the present invention can also acquire substantially the same advantageous effects as the above-mentioned modification 6. Particularly, the thin wall portion 227*h* is formed on the first connecting portion 224*h* of the first gasket 220*h*, and the space 240*h* is formed adjacently to the thin wall portion 227*h*. Accordingly, the space 240*h* is formed adjacently to the thin wall portion 227*h* of the connecting portion and hence, even when the gasket is strongly pressed by swaging with rivets or the like at the time of fixing the positive electrode terminal 200 and the positive electrode current collector 120 to the container 100, it is possible to ensure a place into which the connecting portion slips. Accordingly, it is possible to suppress the occurrence of a damage such as cracking of the gasket disposed between the container 100 and the positive electrode terminal 200 or between the container 100 and the positive current collector 120.

Modifications 9 to 11

Next, modifications 9 to 11 of the above-mentioned embodiment are described. In these modifications, both a first connecting portion of a first gasket and a second connecting portion of a second gasket include a thin wall portion unlike the modification 6.

Figure 19:
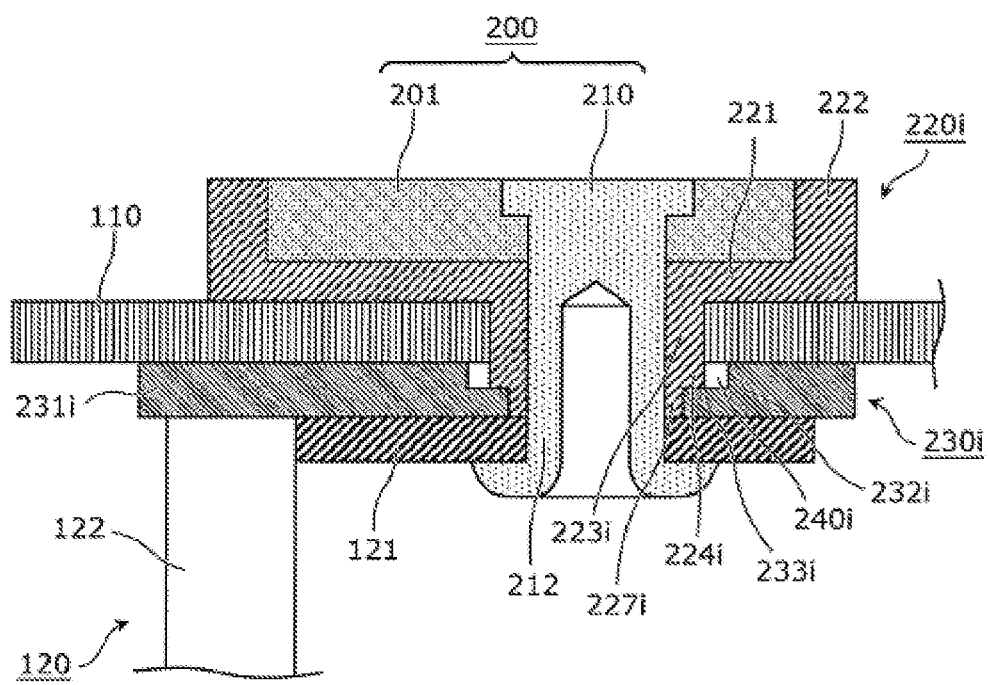
FIG. 19 is a cross-sectional view showing a configuration where a positive electrode terminal according to a modification 9 of the embodiment of the present invention is fixed to a lid body together with a positive electrode current collector.
Figure 19:
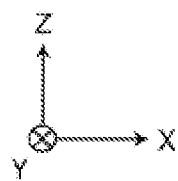
Figure 20:
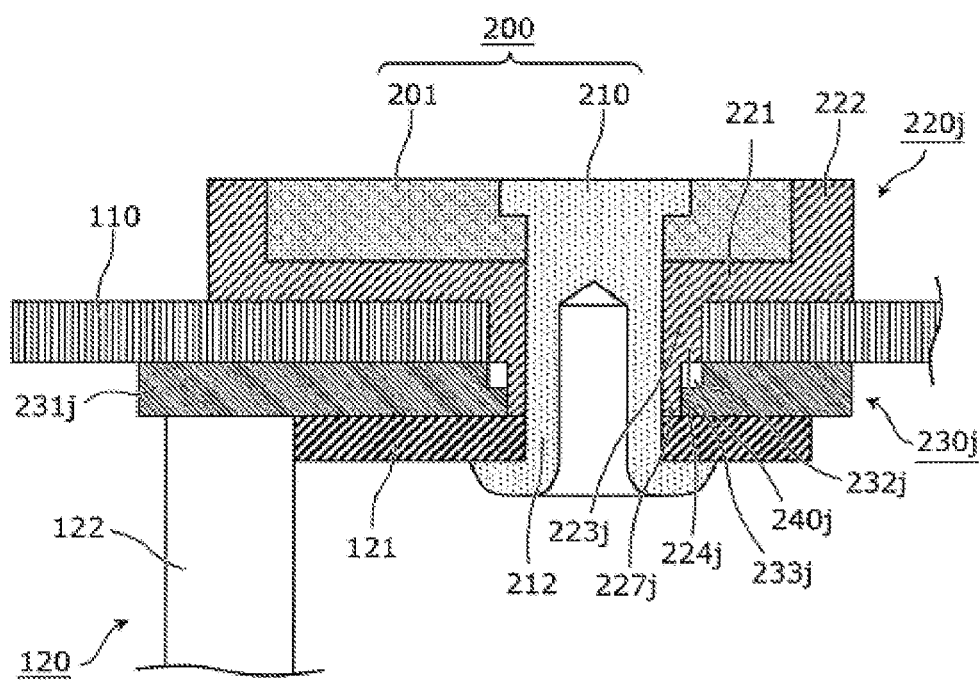
FIG. 20 is a cross-sectional view showing a configuration where a positive electrode terminal according to a modification 10 of the embodiment of the present invention is fixed to a lid body together with a positive electrode current collector.
Figure 20:
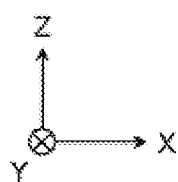
Figure 21:
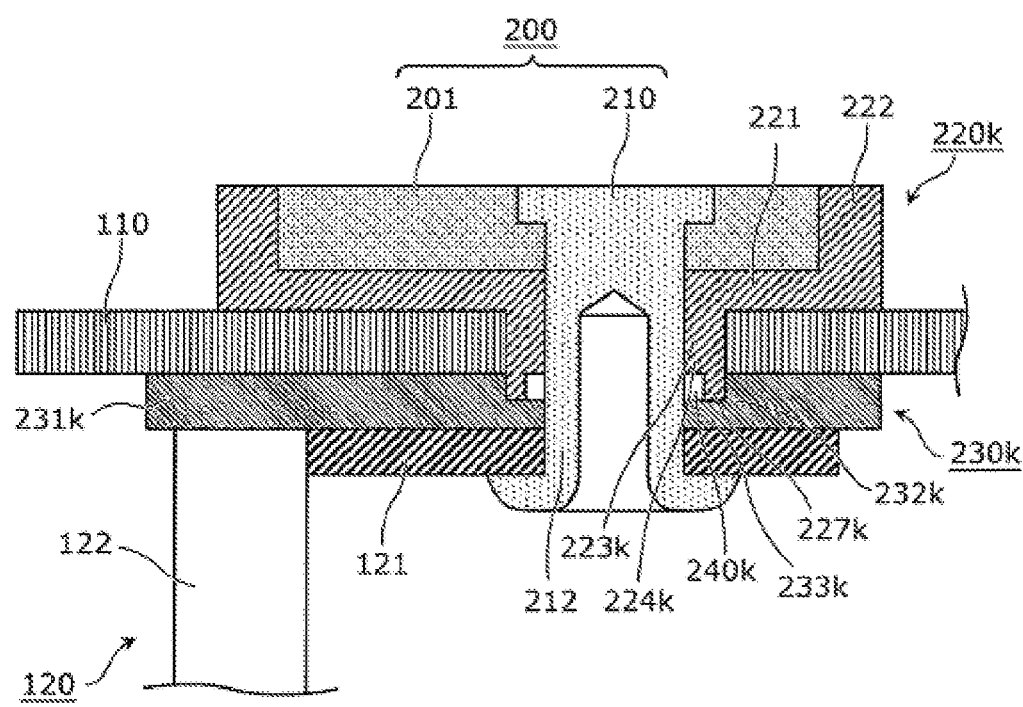
FIG. 21 is a cross-sectional view showing a configuration where a positive electrode terminal according to a modification 11 of the embodiment of the present invention is fixed to a lid body together with a positive electrode current collector.
Figure 21:
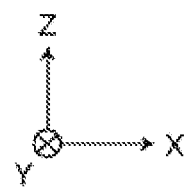

FIG. 19 to FIG. 21 are cross-sectional views each showing the configuration where a positive electrode terminal 200 according to the modifications 9 to 11 of the embodiment of the present invention is fixed to a lid body 110 together with a positive electrode current collector 120. To be more specific, these drawings are views which correspond to FIG. 15.

First, as shown in FIG. 19, the energy storage device of the modification 9 includes a first gasket 220$i$ and a second gasket 230$i$ in place of the first gasket 220 and the second gasket 230$f$ which the energy storage device of the above-mentioned modification 6 includes.

The first gasket 220$i$ includes a cylindrical portion 223$i$, and a first connecting portion 224$i$ is disposed on a distal end portion of the cylindrical portion 223$i$. Further, the first connecting portion 224$i$ includes a thin wall portion 227$i$ having a smaller thickness than other portions.

The second gasket 230$i$ includes a flat plate portion 231$i$ and a second connecting portion 232$i$, and the second connecting portion 232$i$ includes a thin wall portion 233$i$. The first connecting portion 224$i$ and the second connecting portion 232$i$ are engaged with each other by fitting as the thin wall portion 227$i$ and the thin wall portion 233$i$ are brought into contact with each other. An opening portion (recessed portion) having an inner diameter larger than an outer diameter of the first connecting portion 224$i$ of the first gasket 220$i$ is formed on the second connecting portion 232$i$.

Accordingly, a space 240$i$ is disposed around the first connecting portion 224$i$. That is, the space 240$i$ is disposed adjacently to an outer surface of the first connecting portion 224$i$ and an inner surface of the opening portion of the second connecting portion 232$i$.

To be more specific, the space 240$i$ is a space surrounded by an outer surface of the first connecting portion 224$i$, the inner surface of the opening portion of the second connecting portion 232$i$, an upper surface of the thin wall portion 233$i$ of the second connecting portion 232$i$, and a lower surface of a lid body 110.

As shown in FIG. 20, in the modification 10, the first gasket 220$j$ includes a cylindrical portion 223$j$, and a first connecting portion 224$j$ is disposed on a distal end portion of the cylindrical portion 223$j$. Further, the first connecting portion 224$j$ includes a thin wall portion 227$j$ having a smaller thickness than other portions.

The second gasket 230$i$ includes a flat plate portion 231$j$ and a second connecting portion 232$j$, and the second connecting portion 232$j$ includes a thin wall portion 233$j$. The first connecting portion 224$j$ and the second connecting portion 232$j$ are engaged with each other by fitting. An opening portion (recessed portion) having an inner diameter larger than an outer diameter of the thin wall portion 227$j$ of the first gasket 220$j$ is formed on the second connecting portion 232$j$.

Accordingly, a space 240$j$ is disposed around the thin wall portion 227$j$. That is, the space 240$j$ is disposed adjacently to an outer surface of the thin wall portion 227$j$ and an inner surface of the opening portion of the second connecting portion 232$j$. To be more specific, the space 240$j$ is a space surrounded by the outer surface of the thin wall portion 227$j$, the inner surface of the opening portion of the second connecting portion 232$j$, an upper surface of the thin wall portion 233$j$, and a lower surface of the first connecting portion 224$j$.

As shown in FIG. 21, in the modification 11, the first gasket 220$k$ includes a cylindrical portion 223$k$, and a first connecting portion 224$k$ is disposed on a distal end portion of the cylindrical portion 223$k$. Further, the first connecting portion 224$k$ includes a thin wall portion 227$k$ having a smaller thickness than other portions. An opening portion (recessed portion) having an inner diameter larger than an outer diameter of the columnar portion 212 of the fixing portion 210 is formed on the first connecting portion 224$k$.

The second gasket 230$k$ includes a flat plate portion 231$k$ and a second connecting portion 232$k$, and the second connecting portion 232$k$ includes a thin wall portion 233$k$. The first connecting portion 224$k$ and the second connecting portion 232$k$ are engaged with each other by fitting.

Accordingly, a space 240$k$ is disposed around the columnar portion 212. That is, the space 240$k$ is disposed adjacently to an outer surface of the columnar portion 212 and an inner surface of the opening portion formed on the first connecting portion 224$k$ (an inner surface of the thin wall portion 227$k$ of the first connecting portion 224$k$). To be more specific, the space 240$k$ is a space surrounded by the outer surface of the columnar portion 212, the inner surface of the thin wall portion 227$k$, a lower surface of the first connecting portion 224$k$, and an upper surface of the thin wall portion 233$k$ of the second connecting portion 232$k$. This modification differs from the above-mentioned modification 4 with respect to a point that the space 240$k$ remains without being closed even after the fixing by swaging.

As has been described above, the energy storage device according to the modifications 9 to 11 of the embodiment of the present invention can also acquire substantially the same advantageous effects as the above-mentioned modification 6. Particularly, the thin wall portion is formed on both the connecting portion with the first gasket and the connecting portion with the second gasket, and the space is formed adjacently to the thin wall portions. Accordingly, the space is formed adjacently to the thin wall portions of the connecting portions and hence, even when the gasket is strongly pressed by swaging with rivets or the like at the time of fixing the positive electrode terminal 200 and the positive electrode current collector 120 to the container 100, it is possible to ensure a place into which the connecting portion slips. Accordingly, it is possible to suppress the occurrence of a damage such as cracking of the gasket disposed between the container 100 and the positive electrode terminal 200 or between the container 100 and the positive current collector 120.

The space is disposed adjacently to the inner surface of the opening portion formed on the first connecting portion. That is, the space into which the gasket can slip into when the gasket is strongly pressed can be formed by the inner surface of the opening portion and hence, the space can be easily formed.

Modification 12

Next, a modification 12 of the above-mentioned embodiment is described. In this modification, a cylindrical portion is disposed as a separate body from a first gasket unlike the modification 6. That is, in the above-mentioned embodiment and the above-mentioned modifications, the first gasket and the second gasket are disposed in a divided manner. In this modification, however, three divided gaskets are disposed.

Figure 22:
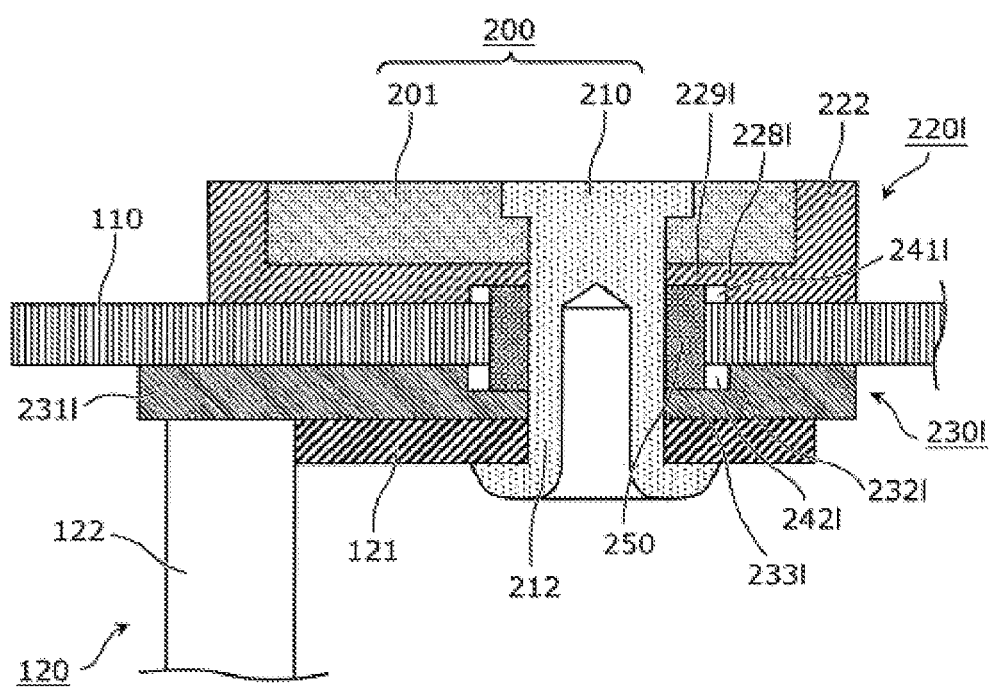
FIG. 22 is a cross-sectional view showing a configuration where a positive electrode terminal according to a modification 12 of the embodiment of the present invention is fixed to a lid body together with a positive electrode current collector.
Figure 22:
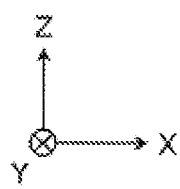

FIG. 22 is a cross-sectional view showing the configuration where a positive electrode terminal 200 according to the modification 12 of the embodiment of the present invention is fixed to a lid body 110 together with a positive electrode current collector 120. To be more specific, FIG. 22 is a view which corresponds to FIG. 15.

As shown in FIG. 22, the energy storage device of this modification includes a first gasket 220$l$, a second gasket 230$l$ and a third gasket 250 in place of the first gasket 220 and the second gasket 230$f$ which the energy storage device of the above-mentioned modification 6 includes. That is, the portion which forms the cylindrical portion 223 of the first gasket 220 in the above-mentioned modification 6 is a body separate from the first gasket 220$l$ as the third gasket 250.

The first gasket 220*l* includes a first connecting portion 228*l*, and the first connecting portion 228*l* includes a thin wall portion 229*l* having a smaller thickness than other portions. The second gasket 230*l* includes a second connecting portion 232*l*, and the second connecting portion 232*l* includes a thin wall portion 233*l* having a smaller thickness than other portions. The third gasket 250 has a circular cylindrical shape.

An opening portion (recessed portion) having an inner diameter larger than an outer diameter of the third gasket 250 is formed on the first connecting portion 228*l*. Accordingly, a space 241*l* is disposed around the third gasket 250. That is, the space 241*l* is disposed adjacently to an outer surface of the third gasket 250 and an inner surface of the opening portion of the first connecting portion 228*l*.

An opening portion (recessed portion) having an inner diameter larger than an outer diameter of the third gasket 250 is formed in the second connecting portion 232*l*. Accordingly, a space 242*l* is disposed around the third gasket 250. That is, the space 242*l* is disposed adjacently to an outer surface of the third gasket 250 and an inner surface of the opening portion of the second connecting portion 232*l*.

To be more specific, the space 241*l* is a space surrounded by the outer surface of the third gasket 250, the inner surface of the opening portion of the first connecting portion 228*l*, a lower surface of the thin wall portion 229*l* of the first connecting portion 228*l*, and an upper surface of a lid body 110. The space 242*l* is a space surrounded by the outer surface of the third gasket 250, the inner surface of the opening portion of the second connecting portion 232*l*, an upper surface of the thin wall portion 233*l* of the second connecting portion 232*l*, and a lower surface of the lid body 110.

As has been described above, the energy storage device according to the modification 12 of the embodiment of the present invention can also acquire substantially the same advantageous effects as the above-mentioned modification 6. Particularly, the third gasket 250 is formed as a body separate from the first gasket 220*l* and hence, the individual gasket can be formed into a simple shape whereby the gasket can be manufactured easily.

Although the energy storage devices according to the embodiment of the present invention and the modification of the embodiment have been described heretofore, the present invention is not limited to the above-mentioned embodiment and modifications of the embodiment. That is, it should be construed that the embodiment and the modifications of the embodiment which are disclosed in this description are provided only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and modifications of the embodiment, the swaged portion 214 is disposed on the end portion on a positive electrode current collector 120 side (inside the container 100) out of the end portions of the fixing portion 210. However, the swaged portion 214 may be disposed on the end portion on a positive electrode terminal 200 side (outside the container 100) out of the end portions of the fixing portion 210. That is, in the above-mentioned embodiment and modifications of the embodiment, the first gasket and the second gasket may be configured in a vertically inverted manner (the boundary between the first gasket and the second gasket and/or the space may be disposed between the positive electrode terminal 200 and the lid body 110).

To be more specific, the first gasket has at least a portion thereof disposed between the terminal body portion 201 and the outer surface 110*a* of the lid body 110 in a normal direction of the lid body 110. The second gasket has at least a portion thereof disposed between the inner surface 110*b* of the lid body 110 and the positive electrode current collector 120 in a normal direction of the lid body 110, and includes the cylindrical portion inserted into the lid body hole portion 112. The cylindrical portion includes the second connecting portion which is the extension portion extending toward the swaged portion 214 from the contact surface between the outer surface 110*a* of the lid body 110 and the first gasket. The outer diameter of the distal end portion of the second connecting portion closest to the swaged portion 214 differs from the outer diameter of the proximal end portion of the second connecting portion on a side opposite to the distal end portion in the normal direction of the lid body 110 or the second connecting portion is disposed adjacently to the space formed between the second connecting portion and the first gasket. The specific configurations of the respective constitutional elements of this modification are substantially equal to those of the respective constitutional elements in the above-mentioned embodiment and modifications of the embodiment and hence, the detailed description of the configurations of the respective constitutional elements of this modification is omitted. Such configurations also can acquire substantially the same advantageous effects as the above-mentioned embodiment and modifications of the embodiment.

The swaging may be applied to both the positive electrode current collector 120 side (inside the container 100) and the positive electrode terminal 200 side (outside the container 100). In this case, it is sufficient that a space is formed on a swaged portion side which contributes to the fixing of the positive electrode terminal 200, the lid body 110 and the positive electrode current collector 120. That is, a space may not be formed on a swaged portion side for fixing the fixing portion and the positive electrode terminal 200 or for fixing the fixing portion and the positive electrode current collector 120.

In the above-mentioned embodiment and modifications of the embodiment, the positive electrode terminal 200 side and the negative electrode terminal 300 side have substantially the same configuration. However, the above-mentioned configuration may be provided to only either the positive electrode terminal 200 side or the negative electrode terminal 300 side.

In the above-mentioned embodiment and modifications of the embodiment, the positive electrode terminal 200, the negative electrode terminal 300 and the like are mounted on the lid body 110 of the container 100. However, the positive electrode terminal 200, the negative electrode terminal 300 and the like may be mounted on a plate-like member (a wall portion of the body 111 or the like) other than the lid body 110 which the container 100 includes.

Modes obtained by combining the above-mentioned embodiment and the above-mentioned modifications with each other are also included in the scope of the present invention. For example, the above-mentioned modification 5 may be applied to the above-mentioned modifications 1 to 4, or the modification 12 may be applied to the above-mentioned modifications 1 to 11.

INDUSTRIAL APPLICABILITY

The present invention is preferably applicable to an energy storage device such as a lithium ion secondary battery.

DESCRIPTION OF REFERENCE SIGNS 10 energy storage device
100 container
110 lid body
110a outer surface
110b inner surface
111 body
112 lid body hole portion
120 positive electrode current collector
121, 131 terminal-side connecting portion
122, 132 electrode assembly connecting portion
123 electrode assembly opening portion
130 negative electrode current collector
140 electrode assembly
200 positive electrode terminal
201, 301 terminal body portion
202 recessed portion
203 terminal opening portion
210, 310 fixing portion
211 upper surface portion
212 columnar portion
213 space
214 swaged portion
220, 220b, 220d, 220h, 220i, 220j, 220k, 220l, 320 first gasket
221 flat plate portion
222 projecting portion
223, 223b, 223d, 223h, 223i, 223j, 223k cylindrical portion
224, 224b, 224d, 224h, 224i, 224j, 224k, 228l first connecting portion
225 accommodating portion
226, 226a, 226b, 226c, 226d, 226e, 226f boundary
227h, 227i, 227j, 227k, 229l, 233f, 233g, 233i, 233j, 233k, 233l thin wall portion
230, 230a, 230b, 230c, 230d, 230e, 230f, 230g, 230h, 230i, 230j, 230k, 230l, 330 second gasket
231, 231f, 231g, 231h, 231i, 231j, 231k, 231l flat plate portion
232, 232a, 232b, 232c, 232d, 232e, 232f, 232g, 232h, 232i, 232j, 232k, 232l second connecting portion
234f recessed portion
235, 235f through hole
236, 236f surface
240, 240a, 240b, 240c, 240d, 240e, 240f, 240g, 240h, 240i, 240j, 240k, 241l,
242l space
250 third gasket
300 negative electrode terminal

The invention claimed is:

1. An energy storage device comprising:
a container including a plate-like portion that has an outer surface and an inner surface and includes a hole portion formed thereon;
an electrode terminal including a terminal body portion that is disposed on the outer surface of the plate-like portion;
a current collector disposed on the inner surface of the plate-like portion;
a first gasket including at least a portion that is disposed between the terminal body portion and the outer surface of the plate-like portion in a normal direction of the plate-like portion, the first gasket including a cylindrical portion that is inserted into the hole portion;
a second gasket including at least a portion that is disposed between the inner surface of the plate-like portion and the current collector in the normal direction of the plate-like portion; and
a fixing portion including a columnar portion that is inserted into the cylindrical portion and a swaged portion that is formed on an end portion of the columnar portion and is brought into contact with the current collector,
wherein the cylindrical portion includes an extension portion extending toward the swaged portion from a contact surface at which the inner surface of the plate-like portion and the second gasket are in contact,
wherein an outer diameter of a distal end portion of the extension portion closest to the swaged portion in the normal direction of the plate-like portion differs from an outer diameter of a proximal end portion of the extension portion opposite to the distal end portion,
wherein at least one of the extension portion and the second gasket includes a thin wall portion having a smaller thickness than other portions,
wherein an opening portion into which the cylindrical portion is inserted is formed in the second gasket,
wherein in a cross-section of the energy storage device that is parallel to the normal direction of the plate-like portion, the extension portion has a first end and a second end, and the first end and the second end are in direct contact with the second gasket,
wherein in the cross-section of the energy storage device, a boundary between the extension portion and the second gasket is inclined with the normal direction of the plate-like portion, and
wherein in the cross-section of the energy storage device, an inner peripheral surface of the opening portion continuously widens in a direction from an outer surface of the second gasket to an inner surface of the second gasket.

2. The energy storage device according to claim 1, wherein the distal end portion of the extension portion further extends radially outwardly from the cylindrical portion, and the outer diameter of the distal end portion of the extension portion is larger than the outer diameter of the proximal end of the extension portion in the normal direction of the plate-like portion.

3. The energy storage device according to claim 1, wherein the cylindrical portion of the first gasket comprises a through hole into which the columnar portion of the fixing portion is inserted, and the through hole has a single inner diameter in a cross section of the through hole passing through an center axis of the cylindrical portion.

4. The energy storage device according to claim 1, wherein in the cross-section of the energy storage device, an entirety of the first end is in direct contact with the second gasket and an entirety of the second end is in direct contact with the second gasket.

5. An energy storage device comprising:
a container including a plate-like portion that has an outer surface and an inner surface and includes a hole portion formed thereon;
an electrode terminal including a terminal body portion that is disposed on the outer surface of the plate-like portion;
a current collector disposed on the inner surface of the plate-like portion;

a first gasket including at least a portion that is disposed between the terminal body portion and the outer surface of the plate-like portion in a normal direction of the plate-like portion, the first gasket including a cylindrical portion that is inserted into the hole portion;

a second gasket including at least a portion that is disposed between the inner surface of the plate-like portion and the current collector in the normal direction of the plate-like portion; and a fixing portion including a columnar portion that is inserted into the cylindrical portion and a swaged portion that is formed on an end portion of the columnar portion and is brought into contact with the current collector, wherein the cylindrical portion includes an extension portion extending toward the swaged portion from a contact surface at which the inner surface of the plate-like portion and the second gasket are in contact, wherein the extension portion is disposed adjacently to a space formed between the extension portion and the second gasket, or an outer diameter of a distal end portion of the extension portion closest to the swaged portion in the normal direction of the plate-like portion differs from an outer diameter of a proximal end portion of the extension portion opposite to the distal end portion, wherein the cylindrical portion is formed as a body separate from the first gasket, wherein the second gasket includes a thin wall portion having a smaller thickness than other portions, and the space is formed at a position adjacent to the thin wall portion, and wherein an end of the extension portion in the normal direction is in direct contact with the thin wall portion of the second gasket.

6. The energy storage device according to claim 5, wherein the cylindrical portion of the first gasket comprises a through hole into which the columnar portion of the fixing portion is inserted, and the through hole has a single inner diameter in a cross section of the through hole passing through an center axis of the cylindrical portion.

* * * * *